US012799865B2

(12) United States Patent
Barnard et al.

(10) Patent No.: US 12,799,865 B2
(45) Date of Patent: Nov. 17, 2026

(54) NON-ROTATING BIT FOR CUTTING TOOL

(71) Applicant: Caterpillar Paving Products Inc., Brooklyn Park, MN (US)

(72) Inventors: Christopher Barnard, Maple Grove, MN (US); Jeff Rhode, Anaheim Hills, CA (US); David Castillo, Orange, CA (US); David B. Parzynski, Jr., Peoria, IL (US); Robert Carr, Sebastian, FL (US); Nicholas B. Johnson, Dayton, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 347 days.

(21) Appl. No.: 18/456,964

(22) Filed: Aug. 28, 2023

(65) Prior Publication Data

US 2024/0384653 A1 Nov. 21, 2024

Related U.S. Application Data

(63) Continuation-in-part of application No. 18/320,679, filed on May 19, 2023.

(51) Int. Cl.
*E21C 35/197* (2006.01)
*B28D 1/18* (2006.01)

(52) U.S. Cl.
CPC ............ *E21C 35/197* (2013.01); *B28D 1/188* (2013.01)

(58) Field of Classification Search
CPC .............................. E21C 35/197; B28D 1/188
See application file for complete search history.

(56) References Cited

U.S. PATENT DOCUMENTS

| | | | |
|---|---|---|---|
| 767,261 | A | 8/1904 | Byer |
| 1,398,304 | A | 11/1921 | Brady |
| 3,552,758 | A | 1/1971 | Siegler |
| 4,594,036 | A | 6/1986 | Hogenhout |
| 5,106,166 | A | 4/1992 | O'Neill |
| 5,628,549 | A | 5/1997 | Ritchey et al. |
| 7,419,224 | B2 | 9/2008 | Hall et al. |
| 7,618,098 | B2 | 11/2009 | Frear |

(Continued)

FOREIGN PATENT DOCUMENTS

| | | | |
|---|---|---|---|
| CN | 201091925 | Y | 7/2008 |
| CN | 203679897 | U | 7/2014 |

(Continued)

OTHER PUBLICATIONS

Kennametal "Road King Diamond Flex" https://www.kennametal.com/us/en/products/construction/road-rehabilit . . . , accessed Apr. 4, 2023, (5 pages).

*Primary Examiner* — Janine M Kreck

(57) ABSTRACT

A cutting bit assembly for attachment to a tool holder of a milling-type machine, including a cutting tip, a generally cylindrical shank extending from the cutting tip, a spring clip surrounding a body of the shank and including a contracted configuration and an expanded configuration, and a washer having an installed configuration in which the washer is disposed on a shoulder of the shank and an uninstalled configuration in which the washer surrounds the spring clip and retains the spring clip in the contracted configuration. At least one of a distal edge of the spring clip or a proximal edge of a bore of the washer comprises a bevel or radius.

19 Claims, 16 Drawing Sheets

(56) References Cited

U.S. PATENT DOCUMENTS

| | | | | |
|---|---|---|---|---|
| 7,992,944 | B2 | 8/2011 | Hall et al. | |
| 8,061,783 | B2 | 11/2011 | Keller et al. | |
| 8,534,767 | B2 | 9/2013 | Hall et al. | |
| 8,646,848 | B2 | 2/2014 | Hall et al. | |
| 9,028,008 | B1 * | 5/2015 | Bookhamer | E21C 35/197 299/104 |
| 9,890,636 | B2 | 2/2018 | Hall et al. | |
| 9,909,417 | B2 | 3/2018 | Hall et al. | |
| 10,107,098 | B2 * | 10/2018 | Sollami | E21C 35/197 |
| 10,385,690 | B2 | 8/2019 | Roth | |
| 10,612,376 | B1 * | 4/2020 | Sollami | F16B 43/00 |
| 2004/0004389 | A1 * | 1/2004 | Latham | E21C 35/18 299/107 |
| 2007/0257545 | A1 * | 11/2007 | Mouthaan | E21C 35/197 299/107 |
| 2009/0200855 | A1 * | 8/2009 | Hall | E21C 35/197 299/108 |
| 2011/0254350 | A1 | 10/2011 | Hall et al. | |
| 2012/0146390 | A1 | 6/2012 | Flynn et al. | |
| 2016/0273356 | A1 * | 9/2016 | Ojanen | E21C 35/197 |
| 2017/0234128 | A1 | 8/2017 | Ries et al. | |
| 2018/0073359 | A1 * | 3/2018 | Kraemer | E21C 35/1933 |
| 2022/0288704 | A1 * | 9/2022 | Kenno | E21C 35/197 |
| 2022/0325624 | A1 * | 10/2022 | Widener | E21C 35/188 |

FOREIGN PATENT DOCUMENTS

| | | | |
|---|---|---|---|
| CN | 218591844 | U | 3/2023 |
| KR | 200390855 | Y1 | 7/2005 |
| WO | 2009053903 | A2 | 4/2009 |
| WO | 2012113707 | A2 | 8/2012 |

* cited by examiner

NON-ROTATING BIT FOR CUTTING TOOL

CROSS-REFERENCE TO RELATED APPLICATION

This application is a continuation-in-part of U.S. patent Ser. No. 18/320,679, filed on May 19, 2023 and entitled "Non-Rotating Bit for Cutting Tool," the disclosure of which is hereby incorporated by reference in its entirety.

TECHNICAL FIELD

The present disclosure relates generally to bits for cutting tools, and more particularly to a non-rotating bit assembly for a tool holder of a milling-type machine such as a cold planer or rotary mixer.

BACKGROUND

Asphalt-surfaced roadways facilitate vehicular travel. Depending upon usage density, base conditions, temperature variation, moisture variation, and/or physical age, the surface of the roadways can eventually become misshapen, non-planar, unable to support wheel loads, or otherwise unsuitable for vehicular traffic. To rehabilitate the roadways for continued vehicular use, worn road surface (e.g., asphalt or concrete) is removed in preparation for resurfacing.

Cold planers, sometimes also called road mills or scarifiers, are machines that typically include a frame supported by tracked or wheeled drive units. The frame is configured to provide a mount for an engine, an operator's station, and a milling drum. The milling drum, fitted with cutting tools, is turned through a suitable interface by the engine to break up the surface of the roadway. In a typical configuration, multiple cutting tools are provided on an external surface of the milling drum. The cutting bits are conventionally mounted to the tool holders such that the cutting bits are free to rotate during use.

However, rotation of the cutting bit has several notable disadvantages. For certain cutting bits, such as those having polycrystalline diamond (PCD) tips, rotation of the cutting bit allows all side of the bit to wear, which reduces the strength of the bit. Further, rotation of cutting tools can lead to wear and consequently reduced service of the tool holder. For example, rotation of the cutting bit may result in wear on the face and the internal bore of the tool holder (that is contacted by the cutting bit) such that the tool holder is less effective at or incapable of holding cutting bits.

U.S. Pat. No. 8,646,848 to Hall et al. (hereinafter "the '848 patent") discloses a pick assembly including a pick shank configured to be press fit directly within a bore of a block. The pick shank includes an inside and outside surface, and the pick includes a pick head opposite the shank. The shank comprises at least one longitudinal recess extending towards the pick head along the shank from a distal end of the shank. The recess allows the shank to resiliently collapse upon insertion into the bore while maintaining a press fit between the bore and the shank. The shank additionally has tapered regions that engage in a press fit with a corresponding tapered region of the bore of the block.

The '848 patent requires a block having a non-standard, tapered bore. As such, the pick shank cannot be used as a universal replacement without first retrofitting the cutting machine with the required tapered block.

The cutting bit assembly of the present disclosure solves one or more of the problems set forth above and/or other problems in the art.

SUMMARY

An aspect of the present disclosure is directed to a cutting bit assembly for attachment to a tool holder of a milling-type machine, including a cutting tip, a generally cylindrical shank extending from the cutting tip, a spring clip surrounding a body of the shank and including a contracted configuration and an expanded configuration, and a washer having an installed configuration in which the washer is disposed on a shoulder of the shank and an uninstalled configuration in which the washer surrounds the spring clip and retains the spring clip in the contracted configuration. At least one of a distal edge of the spring clip or a proximal edge of a bore of the washer includes a bevel or radius.

In another aspect, a method for removing a cutting bit assembly from a tool holder of a milling-type machine, wherein the cutting bit assembly includes spring clip engaging a mounting bore of the tool holder, includes sliding a shank of the cutting assembly out of the mounting bore of the tool holder, and sliding a washer from a shoulder of the shank over the spring clip as the shank is being slid out of the mounting bore to hold the spring clip in a contracted configuration.

In yet another aspect, a washer for a cutting bit assembly of a milling-type machine includes an annular structure defining a bore extending along a longitudinal axis, a beveled outer distal edge of the annular structure, a beveled proximal edge of the bore, a beveled distal edge of the bore, and a vertical sidewall of the bore between the proximal edge of the bore and the distal edge of the bore.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
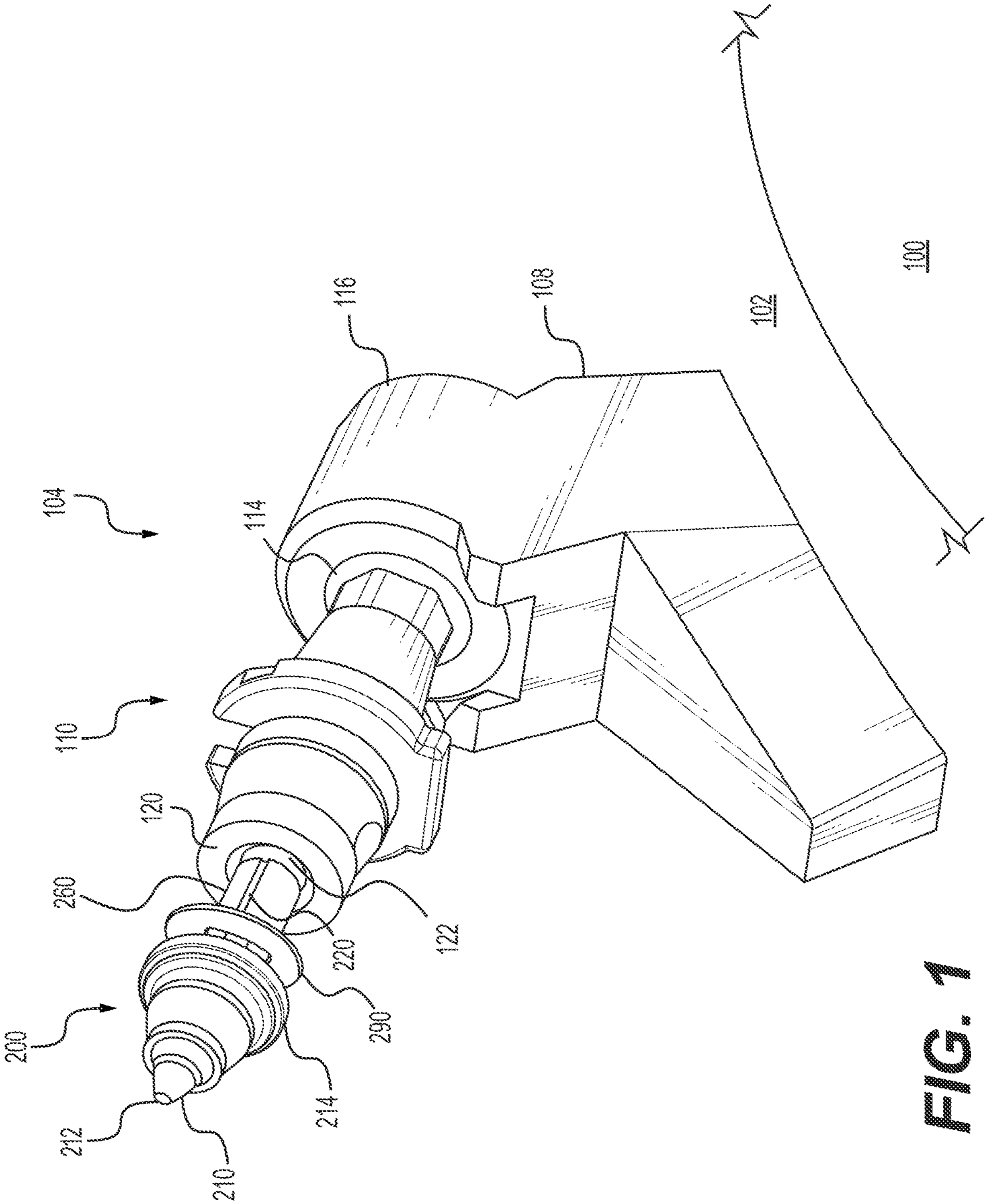
FIG. 1 is an exploded view of a cutting tool of a cold planer, according to aspects of the present disclosure.

Both the foregoing general description and the following detailed description are exemplary and explanatory only and are not restrictive of the features, as claimed. As used herein, the terms “comprises,” “comprising,” “has,” “having,” “includes,” “including,” “limited,” or other variations thereof, are intended to cover a non-exclusive inclusion such that a process, method, article, or apparatus that comprises a list of elements need not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of ±10% in the stated value. Throughout the accompanying drawings, like reference numerals refer to like components.

Referring to FIG. 1, a cold planer or other milling-type of machine (e.g., rotary mixer) includes a milling drum 100 which is a generally cylindrical, rotating structure for cutting and grinding a substrate such as a roadway asphalt. Milling drum 100 has an outer surface 102 on which a plurality of tool assemblies 104 are arranged. Each tool assembly 104 includes a tool mounting block 108, a tool holder 110, and a cutting bit assembly 200. Tool assemblies 104 may be arranged in such a way that rotation of milling drum 100 causes the cutting bit assembly 200 of each tool assembly 104 to fragment and remove material from the roadway surface and channel it to a collection device (not shown). While only a single tool assembly 104 is shown in FIG. 1, milling drum 100 may have several tool assemblies 104 arranged in a series of rows, rings, spirals, etc. on outer surface 102.

For each tool assembly 104, tool mounting block 108 may be fixed to the milling drum outer surface 102, for example, by welding, and is configured to removably receive tool holder 110 in a mounting bore 114 of a mounting portion 116. Tool holder 110 includes an end face 120 and a mounting bore 122 configured to removably receive cutting bit assembly 200. Mounting bore 122 may have an inner diameter of, for example, 20 millimeters (mm). With continued reference to FIG. 1 and further reference to FIGS. 2 and 3, cutting bit assembly 200 includes a cutting tip 210 and a shank 220 extending from cutting tip 210. Cutting tip 210 may be substantially conical and may have a substantially pointed distal end 212 which tapers radially outwardly to form a flange 214 from which shank 220 extends. Flange 214 may have a diameter of about 42-48 mm, and in some aspects about 45 mm. In some aspects, distal end 212 includes a polycrystalline diamond tip for milling the substrate, though other abrasive materials may alternatively be used.

Figure 2:
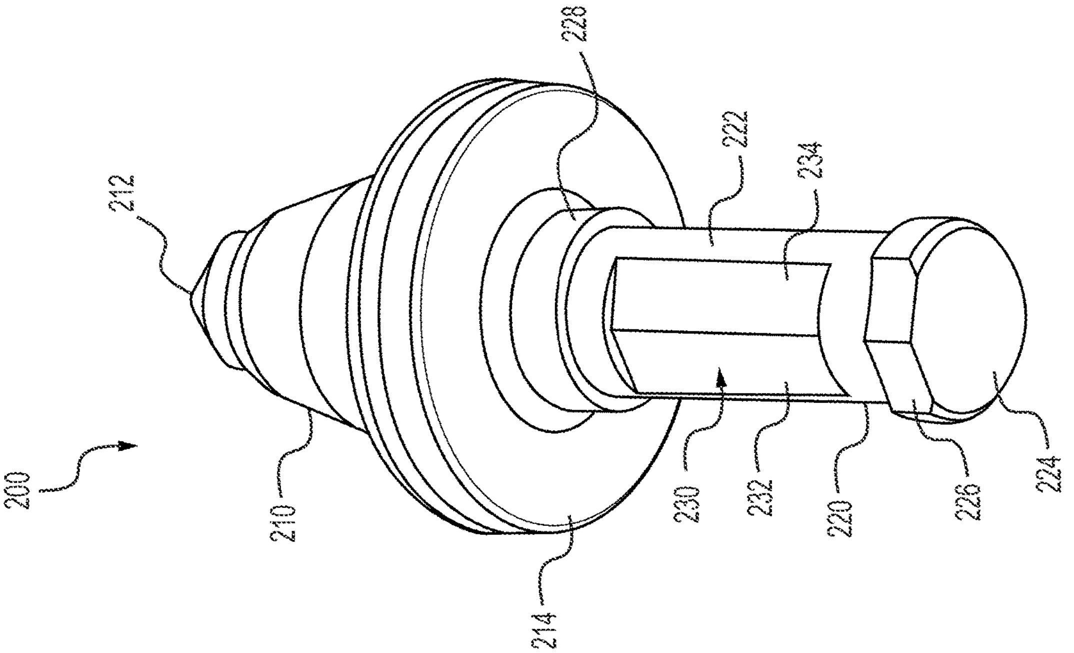
FIG. 2 is a perspective view of a cutting bit, according to aspects of the present disclosure.
Figure 5:
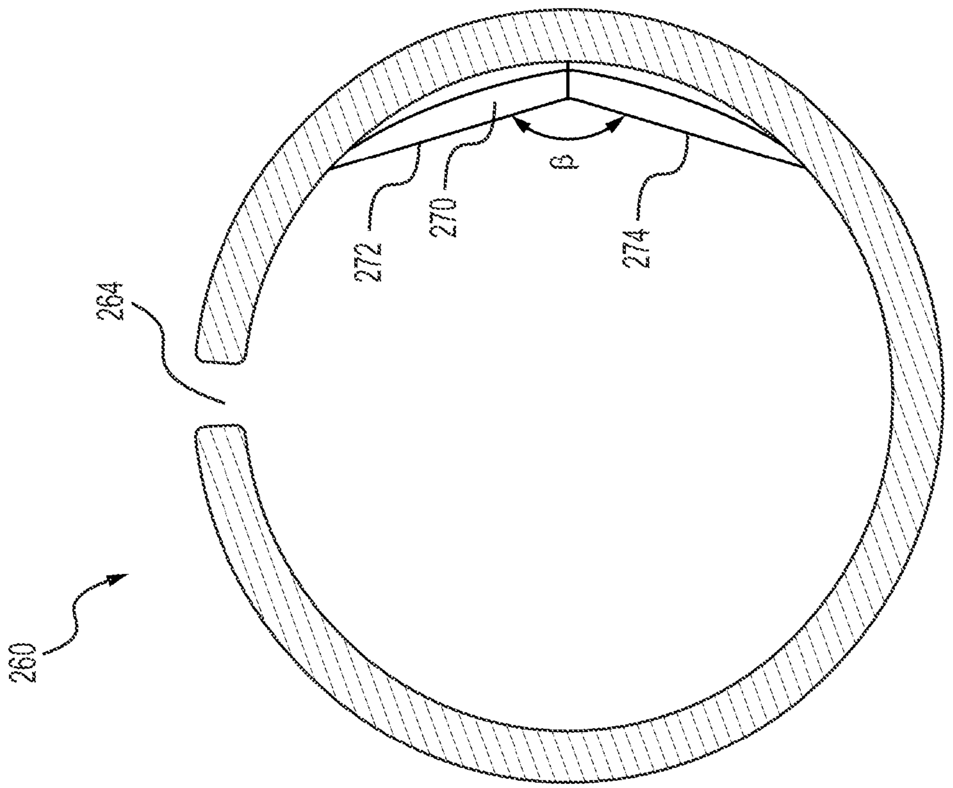
FIG. 5 is a cross-section view of the spring clip of FIG. 4, taken along line 5-5.
Figure 4:
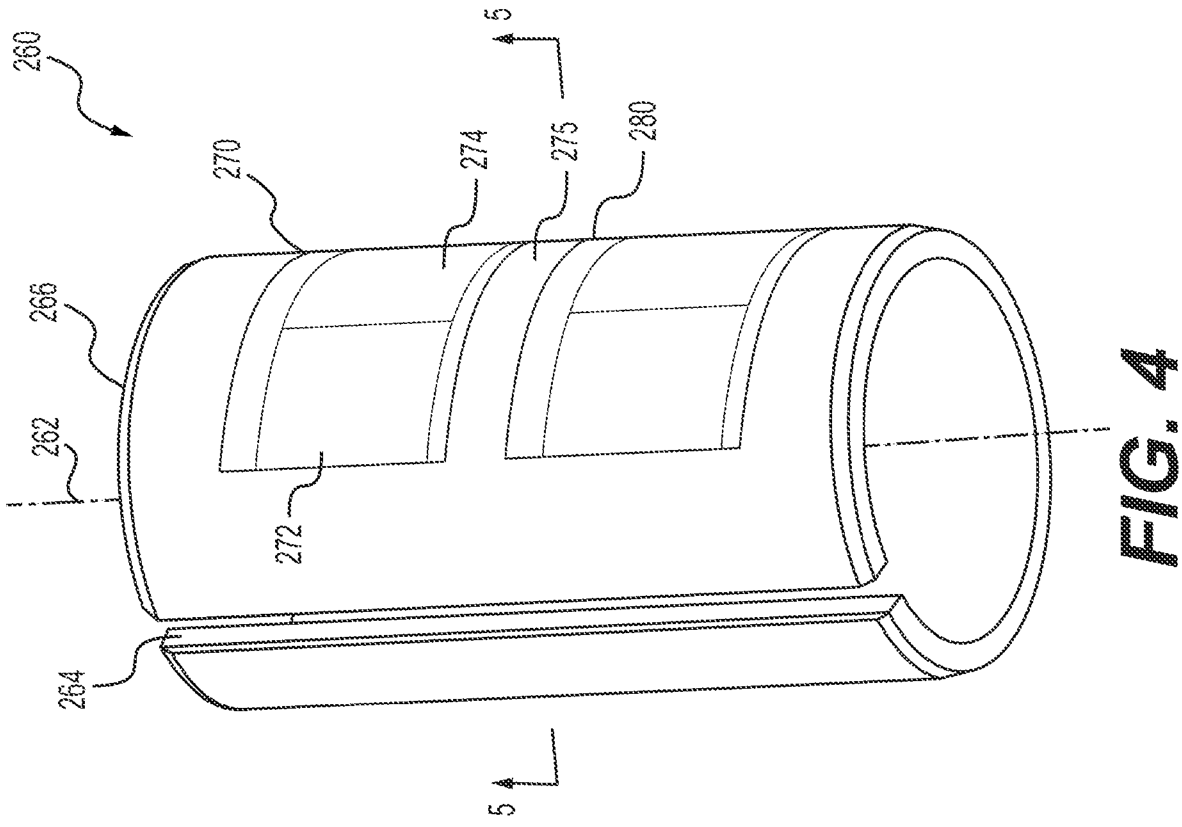
FIG. 4 is a perspective view of a spring clip of the cutting bit assembly of FIG. 3.

With continued reference to FIG. 2, shank 220 includes a body 222, a shoulder 228 between body 222 and flange 214, and a proximal end 224. Body 222 of shank 220 is generally cylindrical apart from the presence of rotation-limiting surface 230, described below. Shoulder 228 is generally cylindrical and extends 360° around body 222. Shoulder 228 may have an outer diameter of slightly less than the diameter of mounting bore 122 of tool holder 110 so that shoulder 228 has a clearance fit with mounting bore 122. For example, shoulder 228 may have an outer diameter of slightly less than 20 mm. Shoulder 228 may extend longitudinally from flange 214 about 3-12 mm, and in some aspects about 5 mm. Proximal end 224 may be generally cylindrical with the exception of notch 226, as described below. Proximal end 224 may have an outer diameter of slightly less than the diameter of mounting bore 122 of tool holder 110 so that proximal end 224 has a clearance fit with mounting bore 122. For example, proximal end 224 may have an outer diameter of slightly less than 20 mm. Proximal end 224 may have a length of about 5-15 mm, and in some aspects about 10 mm.

Body 222 of shank 220 has an outer diameter less than that of shoulder 228 and proximal end 224, such as a diameter of about 10-36 mm, and in some aspects about 14 mm. Body 222 of shank 220 may have a length, i.e. the distance between shoulder 228 and proximal end 224, of about 25-50 mm, and in some aspects about 35 mm. Shank 220, including body 222, proximal end 224, and shoulder 228, may be made from a strong, rigid material such as a heat-treatable steel (e.g., AISI 1040 steel).

Figure 3:
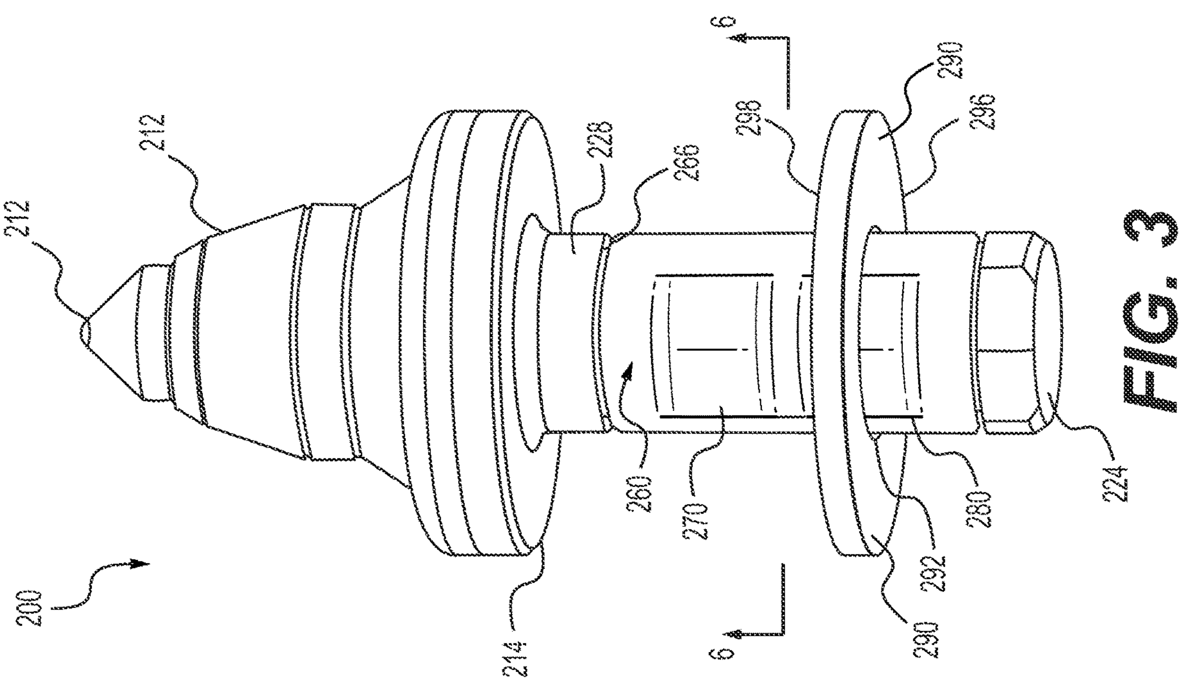
FIG. 3 is a perspective view of a cutting bit assembly, including the cutting bit of FIG. 2, according to aspects of the present disclosure.

As shown in FIGS. 1 and 3, body 222 is at least partially surrounded by a spring clip 260 which can be resiliently deflected between a contracted (or stressed) configuration and an expanded (or unstressed) configuration. Spring clip 260 may be made from a material such as spring steel that imparts elasticity to spring clip 260.

The elasticity of spring clip 260 is such that spring clip 260 is in the expanded configuration in the absence of an external constraint. In the expanded configuration, an outer diameter of spring clip 260 is larger than an inner diameter of mounting bore 122 of tool holder 110. In the contracted configuration, the outer diameter of spring clip 260 is less than that of the expanded configuration to allow spring clip 260 to be inserted into mounting bore 122 of tool holder 110. The outer diameter of spring clip 260 in the contracted configuration is slightly greater than the inner diameter of mounting bore 122, creating a slight press fit between mounting bore 122 and spring clip 260 in the contracted configuration. For example, the outer diameter of spring clip 260, in the contracted configuration, may be slightly greater than 20 mm. In some aspects, the outer surface of spring clip 260 may have a surface treatment to increase friction with mounting bore 122.

Referring now to FIG. 3, cutting bit assembly 200 further includes a washer 290 that surrounds spring clip 260 and holds spring clip 260 in the contracted configuration on body 222 of shank 220. Washer 290 is generally flat and annular in shape, having an outer diameter and a bore concentric with the outer diameter. Washer 290 may have an outer diameter approximately equal to the outer diameter of flange 214. Washer 290 may have a thickness of about 3-8 mm, and in some aspects about 5 mm. Bore of washer 290 has a diameter corresponding to the outer diameter of spring clip 260 in the contracted configuration. Proximal edge 292 and distal edge (obstructed from view in FIG. 3) of the bore of washer 290 may be beveled to assist in installation, removal, and/or reuse of bit assembly 200, as described below. Similarly, proximal edge 296 and distal edge 298 of the outer diameter of washer 290 may be beveled to assist in installation, removal, and/or reuse of bit assembly 200, as described below.

The bias of spring clip 260 acts against the bore of washer 290, which results in a friction fit that maintains an axial position of washer 290 on spring clip 260. When cutting bit assembly 200 is installed into mounting bore 122 of tool holder 110 (see FIG. 1), washer 290 is pushed onto shoulder 228 and into abutment with flange 214 (to the position shown in FIGS. 12 and 14). The bevel on distal edge of the bore of the washer 290 may guide washer 290 onto shoulder 228.

With reference to FIGS. 2 and 3, proximal end 224 of shank 220 may retain spring clip 260 axially on body 222 of shank 220. In the expanded configuration, spring clip 260 may have an inner diameter larger than or equal to an outer diameter of proximal end 224, so that spring clip 260 may be slid over proximal end 224 to install spring clip 260 onto body 222 of shank 220. Washer 290 may be installed after spring clip 260 has been slid onto body 222 of shank 220. Washer 290 forces spring clip 260 into the contracted configuration, in which the inner diameter of spring clip 260 is less than the outer diameter of proximal end 224 of shank 220. As such, spring clip 260 cannot slide over proximal end 224 when in the contracted configuration. Similarly, the inner diameter of spring clip 260, in the contracted configuration, is less than the outer diameter of the shoulder 228, so the spring clip 260 cannot slide over shoulder 228 when in the contracted configuration. Thus, spring clip 260 is retained between shoulder 228 and proximal end 224.

With continued reference to FIG. 2, shank 220 includes a rotation-limiting surface 230 configured to interact with spring clip 260 to limit rotation between shank 220 and spring clip 260. In the aspect shown in FIG. 2, rotation-limiting surface 230 includes a first planar surface 232 and a second planar surface 234. First planar surface 232 and second planar surface 234 may be recessed into body 222 of shank 220, and may be adjacent one another and arranged at an angle $\alpha$ (see FIG. 6) relative to one another. Angle $\alpha$ may be about 135-145°, and in some aspects about 140°. In some aspects (not shown), first and second planar surfaces 232, 234 may be spaced apart from one another Each of first and second planar surfaces 232, 234 may be substantially rectangular, and have a length (along longitudinal axis of shank 220) of about 17-37 mm, and in some aspects about 27 mm, and a width (transverse to longitudinal axis of shank 220) of about 5-10 mm, and in some aspects about 7 mm. In other aspects, first and second planar surfaces 232, 234 may be shapes other than rectangular, e.g. pill-shaped, oval, trapezoidal, hexagonal, or the like.

In some aspects, each of first and second planar surfaces 232, 234 may be spaced apart from shoulder 228 by about 2-8 mm, and in some aspects about 5 mm. In some aspects, each of first and second planar surfaces 232, 234 may be spaced apart from proximal end 224 by about 5-16 mm, and in some aspects about 12 mm.

Referring now to FIGS. 3-6, spring clip 260 extends along a longitudinal axis 262 and is generally tubular in shape (apart from protrusions 270, 280). Spring clip 260 includes a slit 264 extending from a proximal end to a distal end to allow spring clip 260 to transition between the contracted configuration and the expanded configuration. In particular, slit 264 is narrower in the contracted configuration of spring clip 260 than in the expanded configuration of spring clip 260. In some aspects, a distal edge 266 of spring clip 260 may be beveled. In some aspects, the wall thickness of spring clip 260 may be between about 1.50 mm and 1.75 mm.

Spring clip 260 includes one or more internal protrusions extending radially inward towards longitudinal axis 262 from the inner diameter. In the aspect shown in FIGS. 3-6, spring clip 260 includes two protrusions 270 and 280 spaced apart along longitudinal axis 262. Protrusions 270, 280 may be formed by a press operation such that protrusions 270, 280 are indented into the sidewall of spring clip 260. In other aspects, protrusions 270, 280 may include material added to inner sidewall of the spring clip 260. Protrusion 270 includes a third planar surface 272 and a fourth planar surface 274. Third planar surface 272 and fourth planar surface 274 may be arranged at an angle $\beta$ relative to one another (see FIG. 5). Angle $\beta$ may be about 136-156°, and in some aspects about 146°. Each of third and fourth planar surfaces 272, 274 may be substantially rectangular, and have a length (along longitudinal axis of shank 220) of about 7-17 mm, and in some aspects about 11 mm, and a width (transverse to longitudinal axis of shank 220) of about 4-8 mm, and in some aspects about 6 mm. The overall length of the protrusions, including both third and fourth planar surfaces 272, 274 of protrusion 270 and analogous planar surfaces of protrusion 280, may be about 8-35 mm, and in some aspects about 27 mm. In other aspects, third and fourth planar surfaces 272, 274 may be shapes other than rectangular, e.g. pill-shaped, oval, trapezoidal, hexagonal, or the like.

Figure 6:
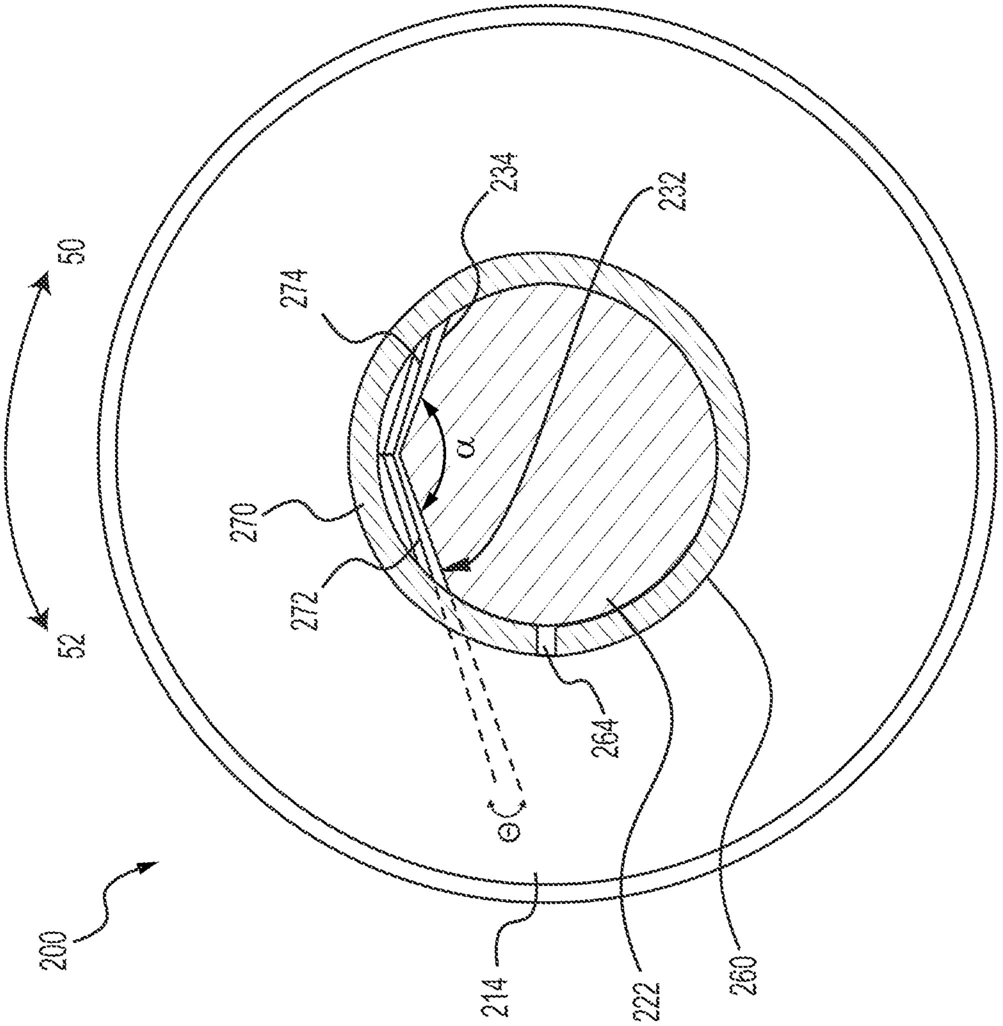
FIG. 6 is a cross-sectional view of the cutting bit assembly of FIG. 3, taken along line 6-6.

As shown in FIG. 6, protrusion 270 of spring clip 260 interacts with rotation-limiting surface 230 of shank 220 to limit rotation of shank 220 relative to spring clip 260 in both the contracted and expanded configurations of spring clip 260. In particular, third planar surface 272 of spring clip 260 is configured to engage first planar surface 232 of rotation limiting surface 230 of shank 220 to limit rotation of shank 220 in a clockwise direction 50 within spring clip 260. Similarly, fourth planar surface 274 of spring clip 260 is configured to engage second planar surface 234 of rotation limiting surface 230 of shank 220 to limit rotation of shank 220 in a counter-clockwise direction 52 within spring clip 260.

In some aspects, angle $\beta$ of protrusion 270 of spring clip 260 is greater than angle $\alpha$ of rotation-limiting surface 230 of shank 220. As such, an angular gap $\theta$ is present between first planar surface 232 and third planar surface 272, and/or present between second planar surface 234 and fourth planar surface 274. Angular gap $\theta$ allows limited rotation of shank 220 within spring clip 260. Shank 220 may be rotated in clockwise direction 50 within spring clip 260 until first planar surface 232 of rotation-limiting surface 230 engages third planar surface 272 of protrusion 270. Similarly, shank 220 may be rotated in counter-clockwise direction 52 within spring clip 260 until second planar surface 234 of rotation-limiting surface 230 engages fourth planar surface 274 of protrusion 270.

Angle β of protrusion 270 of spring clip 260 may be greater when spring clip 260 is in the expanded configuration compared to the retracted configuration, due to the overall expansion of spring clip 260. Thus, shank 220 may have less rotational freedom relative to spring clip 260 when spring clip 260 is in the contracted configuration compared to when spring clip 260 is in expanded configuration.

Protrusion 280 may be substantially identical to protrusion 270, including a third planar surface and a fourth planar surface analogous to third planar surface 272 and fourth planar surface 274, respectively. Protrusions 270 and 280 may be separated by a rib 275 that provides rigidity to and resists deformation of spring clip 260. In some aspects, spring clip 260 may include only a single protrusion 270, with rib 275 being absent.

In order to accommodate protrusions 270 and 280, proximal end 224 of shank 220 (see FIG. 2) includes a notch 226 that provide clearance for protrusions 270, 280 to slide over proximal end 224 onto body 222 of shank 220 when spring clip 260 is being installed on shank 220. Notch 226 is shaped to accommodate protrusions 270, 280. Thus, notch 226 may include a pair of planar surfaces respectively allowing third planar surface 272 and fourth planar surface 274 of protrusion 270 (along with analogous surfaces of protrusion 280) to slide over proximal end 224.

Figure 7:
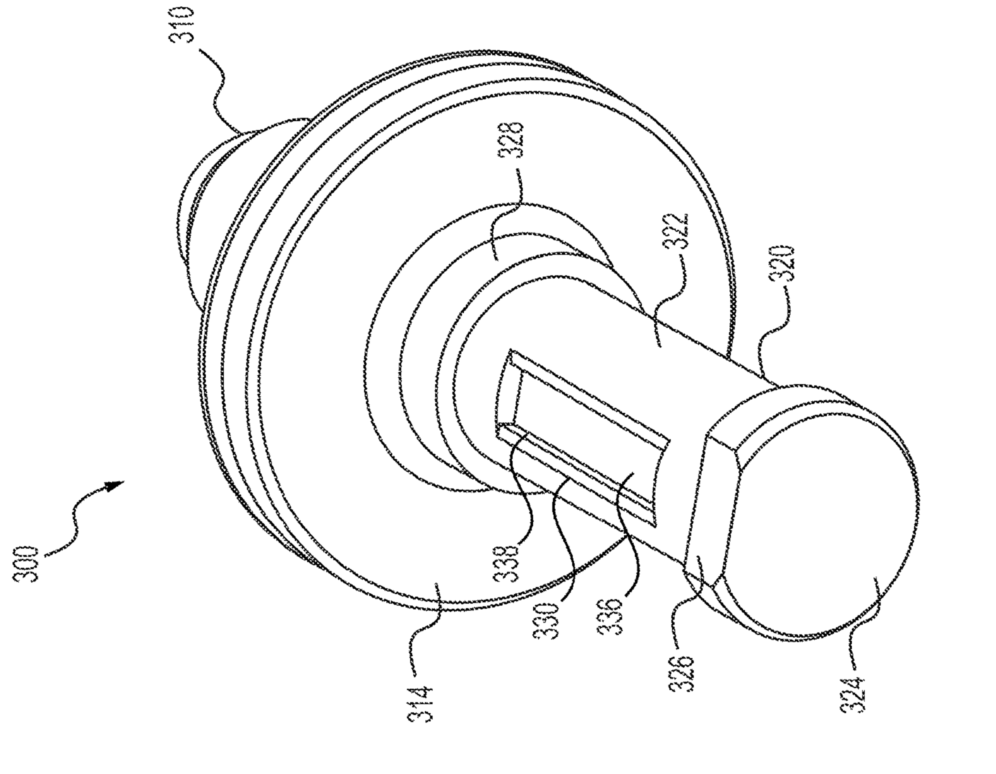
FIG. 7 is a perspective view of an alternative cutting bit, according to aspects of the present disclosure.

FIGS. 7, 8, 9A, and 10 illustrate another aspect of cutting bit assembly 300 according to the present disclosure, with corresponding components of cutting bit assembly 200 shown by 100 added to the reference number. Components not specifically described in relation to FIGS. 7-10 may be presumed to be substantially similar to corresponding components of the aspect of FIGS. 2-6. Cutting tip 310 of the aspect of FIGS. 7, 8, and 10 may be substantially identical to cutting tip 210 of FIGS. 2-6. As shown in FIG. 7, rotation-limiting surface 330 of body 322 of shank 320 includes a groove 336 recessed into body 322. Groove 336 may be about 17-37 mm long, and in some aspects about 27 mm long, and about 8-15 mm wide, and in some aspects about 12 mm wide. Groove 336 may be recessed into body 322 of shank 320 by about 1-5 mm relative to the outer diameter of body 322, and in some aspects by about 2 mm relative to the outer diameter of body 322. Groove 336 may be spaced apart from shoulder 328 by about 2-8 mm, and in some aspects about 5 mm. Groove 336 may be spaced apart from proximal end 324 by about 5-16 mm, and in some aspects about 12 mm.

Figure 8:
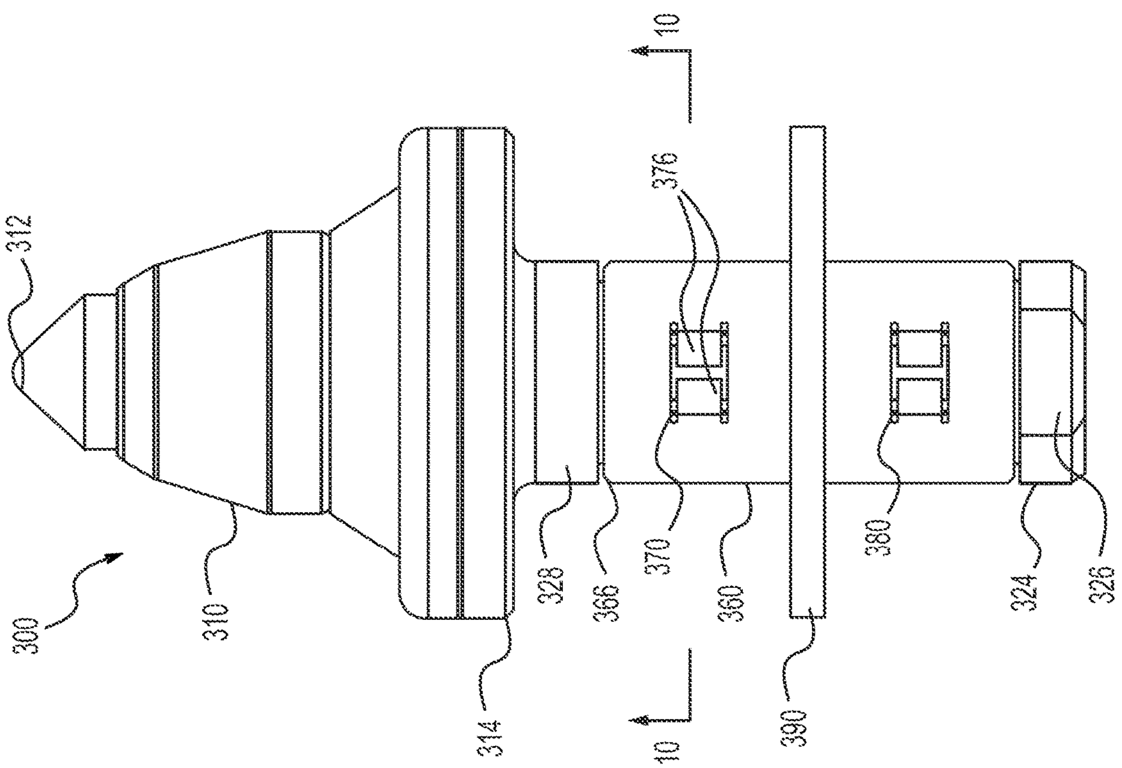
FIG. 8 is a side elevational view of a cutting bit assembly, including the cutting bit of FIG. 7, according to aspects of the present disclosure.
Figure 9B:
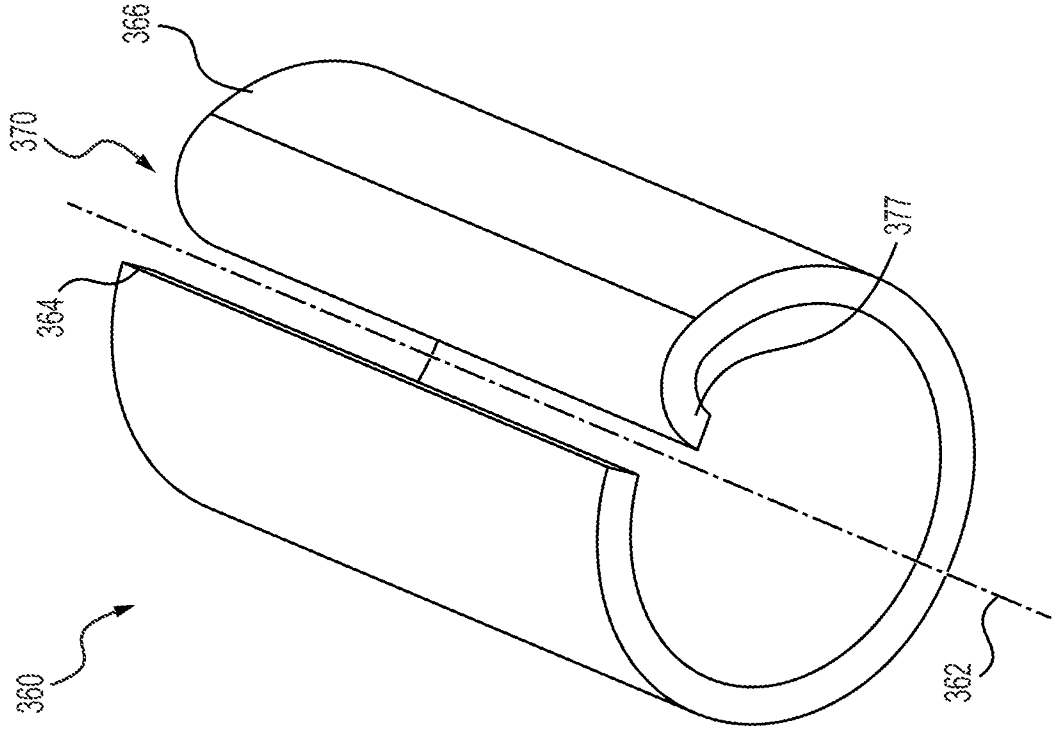
FIG. 9B is a perspective view of an alternative spring clip, according to aspects of the present disclosure.
Figure 9A:
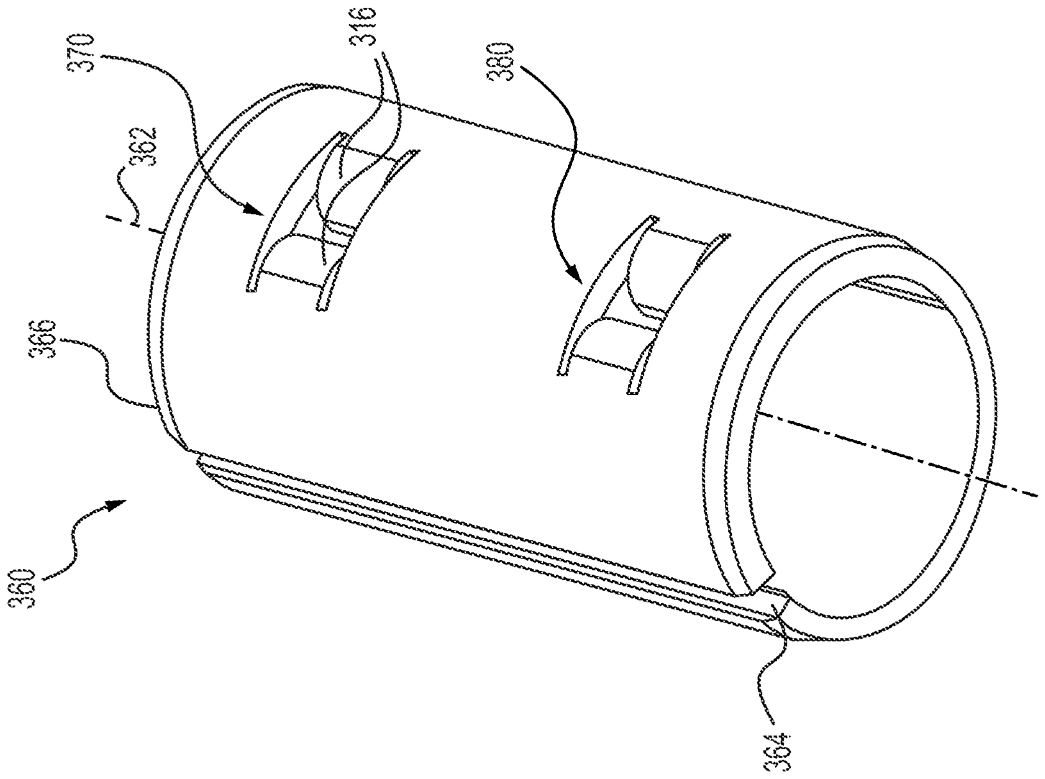
FIG. 9A is a perspective view of a spring clip of the cutting bit assembly of FIG. 8.
Figure 10:
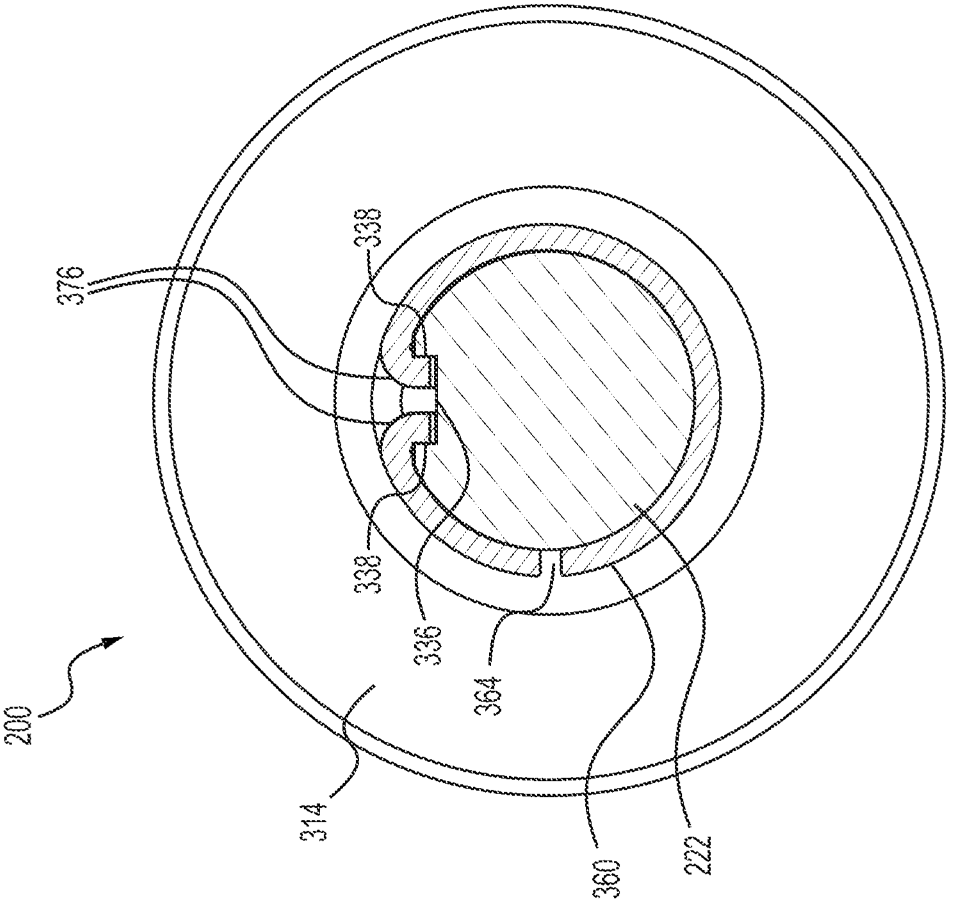
FIG. 10 is a cross-sectional view of the cutting bit assembly of FIG. 8, taken along line 10-10.

As shown in FIGS. 8, 9A, and 10, protrusion 370 of spring clip 360 includes tabs 376 extending radially inward toward longitudinal axis 362. The illustrated aspect includes two tabs 376, though any number of tabs (such as one, two, three, four, etc.) may be used. Tabs 376 may be formed, for example, by a punch operation to bend tabs 376 inward. Tabs 376 may be generally symmetric, as illustrated, but need not be so. Tabs 376 may have a length (in a direction parallel to longitudinal axis of shank 320) of about 4-10 mm, and in some aspects of about 7 mm. Tabs 376 may extend inward from the inner sidewall of spring clip 360 by about 1-4 mm, and in some aspects by about 2 mm. Protrusion 380 may be substantially identical to protrusion 370. In some embodiments, spring clip 360 may include only a single protrusion 370.

As shown in FIG. 10, tabs 376 interact with rotation-limiting surface 330 in both the contracted and expanded configuration of spring clip 360 to limit rotation of shank 320 within spring clip 360. In particular, tabs 376 extend into groove 336 of shank 320 so that rotation of shank 320 causes tabs to engage sidewalls 338 of groove 336. In some aspects, as shown in FIG. 10, there is negligible clearance between tabs 376 and sidewalls 338, so little or no rotation of shank 320 relative to spring clip 360 is permitted. In other aspects, there may be clearance between tabs 376 and sidewalls 338 to allow a limited, predetermined amount of rotation of shank 320 relative to spring clip 360.

As shown in FIGS. 7 and 8, notch 326 in proximal end 324 of shank 320 may include a single planar surface to allow tabs 376 to clear proximal end 324 as spring clip 360 is installed onto shank 320.

As shown in FIG. 8, washer 390 retains spring clip 360 in the contracted configuration in same manner as described herein in connection with the aspect of FIGS. 2-6.

FIG. 9B illustrates another aspect of spring clip 360. Spring clip 360 of FIG. 9B includes a single protrusion, namely protrusion 370, which may extend substantially the entire length of spring clip 360. Protrusion 370 includes a tab 377 extending radially toward longitudinal axis 362. Tab 377 may be formed by rolling or bending one of the edges of spring clip 360 on either side of slit 364. Tab 377 fits into groove 336 of shank 320 (see FIG. 10) in substantially the same manner as tabs 376 of the aspect of FIG. 9A, and tab 377 engages sidewalls 338 of groove 336 to limit or prevent rotation of shank 320 relative to spring clip 360. Because the aspect of FIG. 9B includes only a single tab 377, groove 336 of shank 320 may be narrower than shown in FIG. 10 to limit slop between tab 377 and sidewalls 338 of groove 336. Further, groove 336 may extend substantially the entire length of body 322 of shank 320 in order to accommodate tab 377, which extends substantially the entire length of spring clip 360. That is, groove 336 may extend substantially the entire distance between proximal end 324 and shoulder 328. In other aspects (not shown), both edges of spring clip on either side of slit 364 may be formed into a tab, and groove 336 of shank 320 may be of a width suitable to accommodate two tabs.

Figure 12:
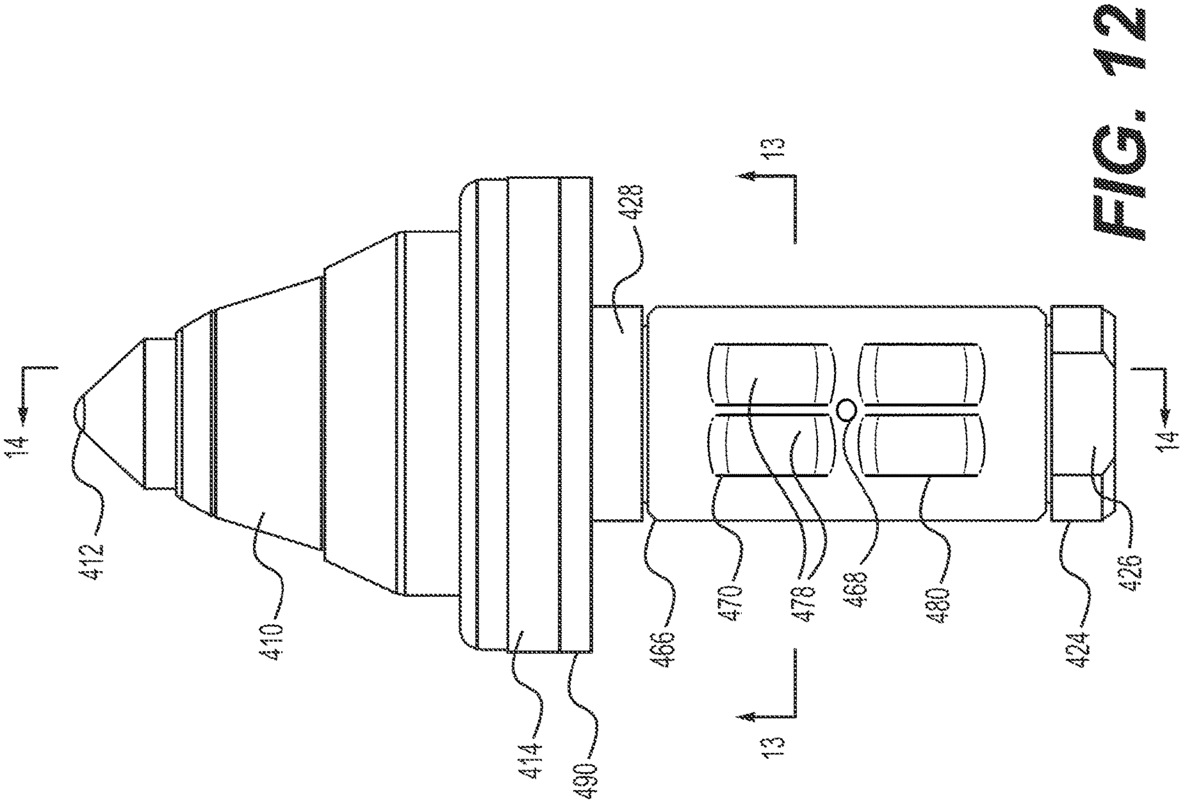
FIG. 12 is a side view of a cutting bit assembly, including the cutting bit of FIG. 11, according to aspects of the present disclosure.
Figure 11:
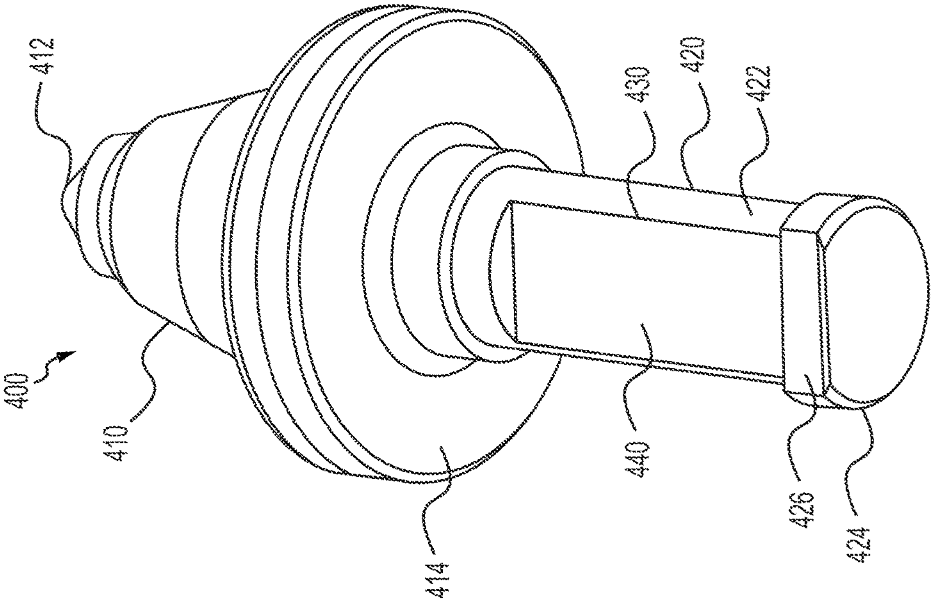
FIG. 11 is a perspective view of yet another cutting bit, according to aspects of the present disclosure.
Figure 13:
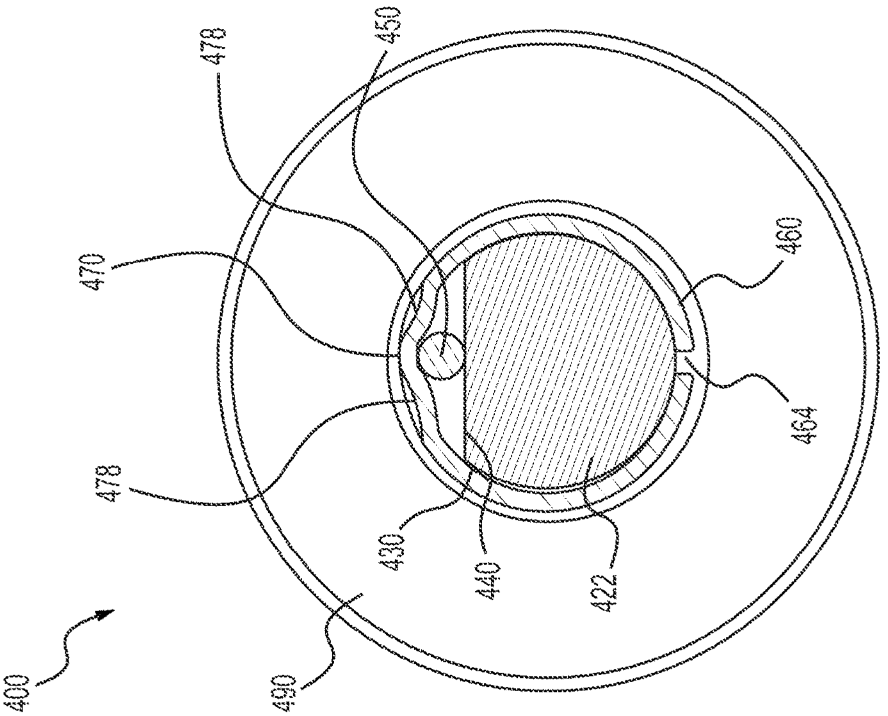
FIG. 13 is a cross-sectional view of the cutting bit assembly of FIG. 12, taken along line 13-13, according to aspects of the present disclosure.

FIGS. 11-14 illustrate another aspect of cutting bit assembly 400 according to the present disclosure, with corresponding components of cutting bit assembly 200 shown by 200 added to the reference number. Components not specifically described in relation to FIGS. 11-14 may be presumed to be substantially similar to corresponding components of the aspect of FIGS. 2-6. Cutting tip 410 of the aspect of FIGS. 11-14 may be substantially identical to cutting tip 210 of FIGS. 2-6. As shown in FIGS. 11 and 13, rotation-limiting surface 430 may include a single planar surface 440 recessed into body 422. Planar surface 440 may be about 17-37 mm long, and in some aspects about 27 mm long, and about 13-16 mm wide, and in some aspects about 15 mm wide. Planar surface 440 may be recessed into body 422 of shank 420 by about 2-6 mm relative to the outer diameter of body 422, and in some aspects by about 4 mm relative to the outer diameter of body 422. Planar surface 440 may be spaced apart from shoulder 428 by about 2-8 mm, and in some aspects about 5 mm. Planar surface 440 may be spaced apart from proximal end 424 by about 5-16 mm, and in some aspects about 12 mm. Planar surface 440 may extend partially around circumference of body 422 of shank 420, such as about 99-139° around circumference of body 422, and in some aspects about 119° around circumference of body 422.

Figure 14:
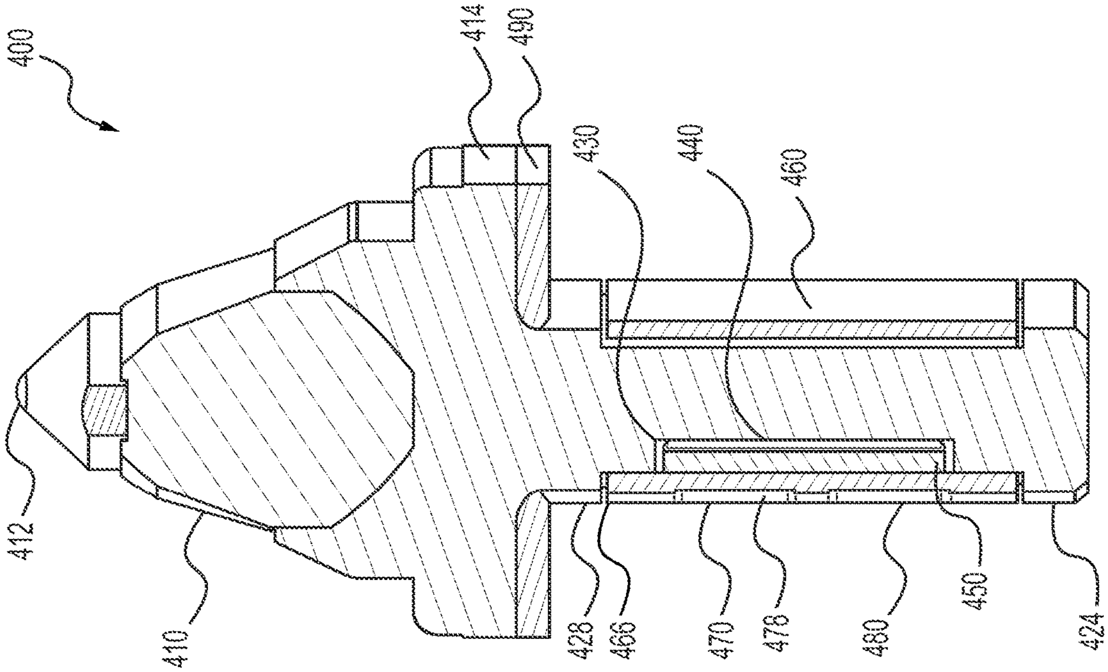
FIG. 14 is a cross-sectional view of the cutting bit assembly of FIG. 12, taken along line 14-14.

As shown in FIGS. 13-14, cutting bit assembly 400 further includes a pin 450 constrained between spring clip 460 and rotation-limiting surface 430 of shank 420. Pin 450 is generally cylindrical and is aligned parallel to longitudinal axis of spring clip 460. Pin 450 may have a length of about 15-35 mm, or in some aspects about 25 mm, and a diameter of about 1-5 mm, or in some aspects about 3 mm. Spring clip 460 may include an inspection aperture 468 that allows viewing of pin 450 through spring clip 460 so that an operator/installer can verify that pin 450 is properly seated between spring clip 460 and planar surface 440 of shank 420 prior to and/or during installation of cutting bit assembly 400 into milling drum 100.

As shown in FIGS. 12 to 14, protrusions 470, 480 of spring clip 460 retain pin 450 in position on planar surface 440. Protrusions 470, 480 interact with rotation-limiting surface 440, via pin 450, in both the contracted and expanded configuration of spring clip 460 to limit rotation of shank 420 within spring clip 460. Protrusion 470 includes one or more indentations 478 extending radially inward to laterally constrain pin 450 on planar surface 440 of rotation-limiting surface 430. Attempted rotation of shank 420 relative to spring clip 460 causes indentations 478 to bind pin 450 against planar surface 440, limiting rotation of shank 420 relative to spring clip 460. In various aspects, indentations 478 may be curved, as shown in FIG. 14, or may be substantially flat. Each of indentations 478 may be substantially rectangular and have a length (along longitudinal axis of shank 420) of about 6-25 mm, and in some aspects about 8 mm, and a width (transverse to longitudinal axis of shank 420) of about 3-7 mm, and in some aspects about 5 mm. In other aspects, indentations 478 may be shapes other than rectangular, e.g. pill-shaped, oval, trapezoidal, hexagonal, or the like.

FIGS. 12 and 14 show washer 490 disposed about shoulder 428 of shank 420, which is the position of washer 490 when cutting bit assembly 400 is secured in mounting bore 122 of tool holder 110. Prior to installation in tool holder, washer 490 surrounds spring clip 460 and retains spring clip 460 in the contracted configuration in the same manner as described herein in connection with the aspect of FIGS. 2-6.

Figure 15:
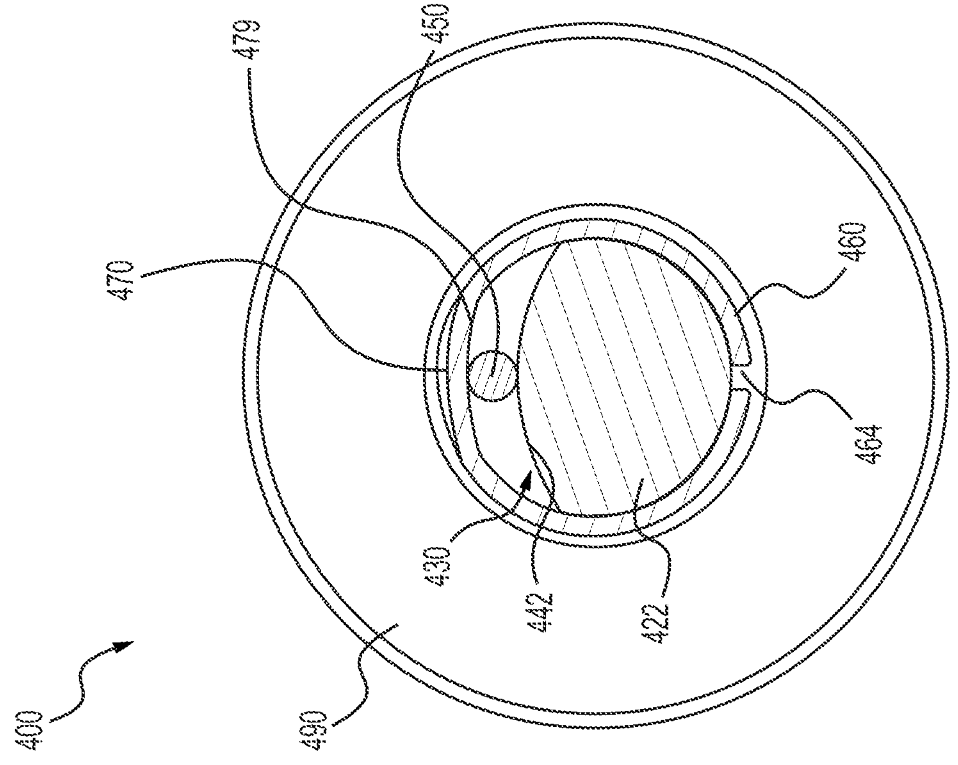
FIG. 15 is a cross-sectional view of yet another cutting bit assembly according to aspects of the present disclosure.

FIG. 15 illustrates another aspect of cutting bit assembly 400 according to the present disclosure, which is substantially similar to the aspect of FIGS. 11-14. Corresponding components of cutting bit assembly 400 of FIGS. 11-14 are shown by the same reference numbers. FIG. 15 illustrates a cross-sectional view of cutting bit assembly 400 at the same cross-sectional location as the view of FIG. 13. The aspect of FIG. 15 differs from that of FIGS. 11-14 in that rotation limiting surface 430 includes a convex surface 442 recessed into body 422 of shank 420. Convex surface 442 may be not be coaxial with the remainder of the body 422 of shank 420, and convex surface 442 may have a radius different than (i.e., greater than or less than) the remainder of the body 422 of shank 420. Protrusion 470 includes a concave surface 479 configured to constrain pin 450 against convex surface 442. Concave surface 479 of protrusion 470 may be not be coaxial with the remainder of spring clip 460, and concave surface 479 may have a radius different than (i.e., greater than or less than) the remainder of spring clip 260. Concave surface 479 of protrusion 470 is configured to bind against pin 450 to limit or prohibit rotation of body 422 of shank 420 relative to spring clip 460.

Figure 16:
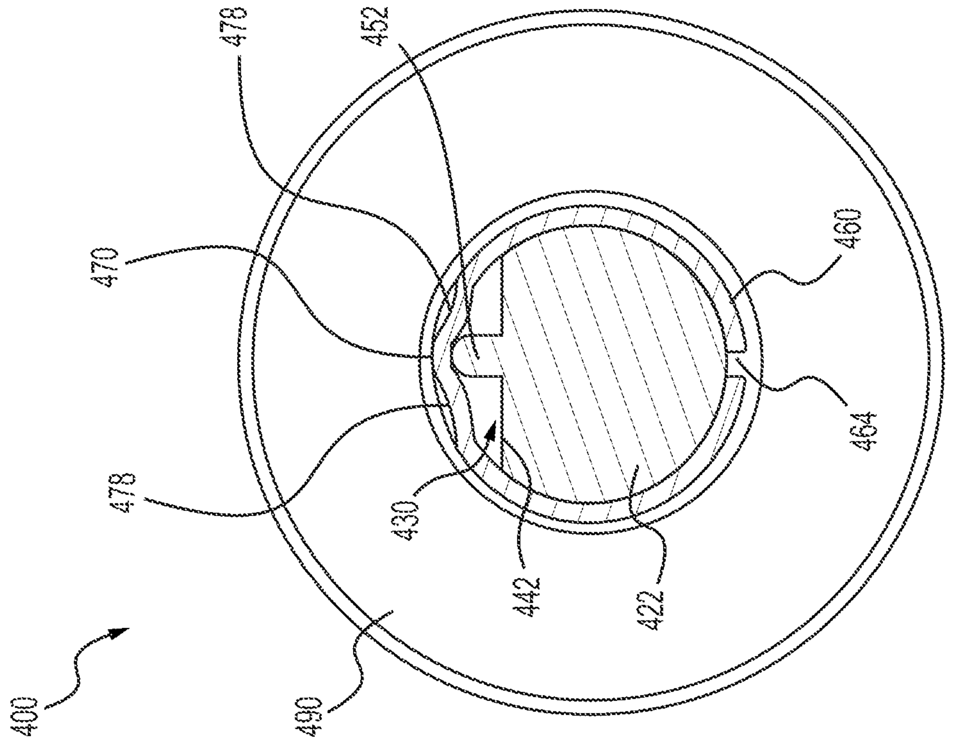
FIG. 16 is a cross-sectional view of yet another cutting bit assembly according to aspects of the present disclosure.

FIG. 16 illustrates another aspect of cutting bit assembly 400 according to the present disclosure, which is substantially similar to the aspect of FIGS. 11-14. Corresponding components of cutting bit assembly 400 of FIGS. 11-14 are shown by the same reference numbers. FIG. 16 illustrates a cross-sectional view of cutting bit assembly 400 at the same cross-sectional location as the view of FIG. 13. The aspect of FIG. 16 differs from that of FIGS. 11-14 in that instead of having pin 450 as a separate component, rotation limiting surface 430 of the aspect of FIG. 16 includes an integrally formed projection 452. Projection 452 may extend longitudinally parallel to planar surface 440. Projection 452 may be in the shape of a semi-cylinder, i.e. a cylinder split longitudinally, and may generally interact with protrusion 470 of spring clip 460 in a manner similar to pin 450 of FIGS. 11-14. In particular, protrusion 470 of spring clip 460 is configured to bind against projection 452 to limit or prohibit rotation of body 422 of shank 420 relative to spring clip 460.

FIGS. 19-24 illustrate an aspect of cutting bit assembly 500 according to the present disclosure, which may correspond to any of the previously described aspects of FIGS. 1-16. Components of cutting bit assembly 500 which correspond to components of the aspect of FIGS. 2-6 are shown by 300 added to the reference number of the corresponding component. (For example, cutting tip 510 of FIGS. 19-24 corresponds to cutting tip 210 of FIGS. 2-6.) Components not specifically described in relation to FIGS. 19-24 may be presumed to be substantially similar to corresponding components of the aspect of FIGS. 2-6. Similarly, components shown but not specifically described in FIGS. 1-16 may be presumed to be substantially similar to corresponding components of the aspect of FIGS. 19-24.

Figure 19:
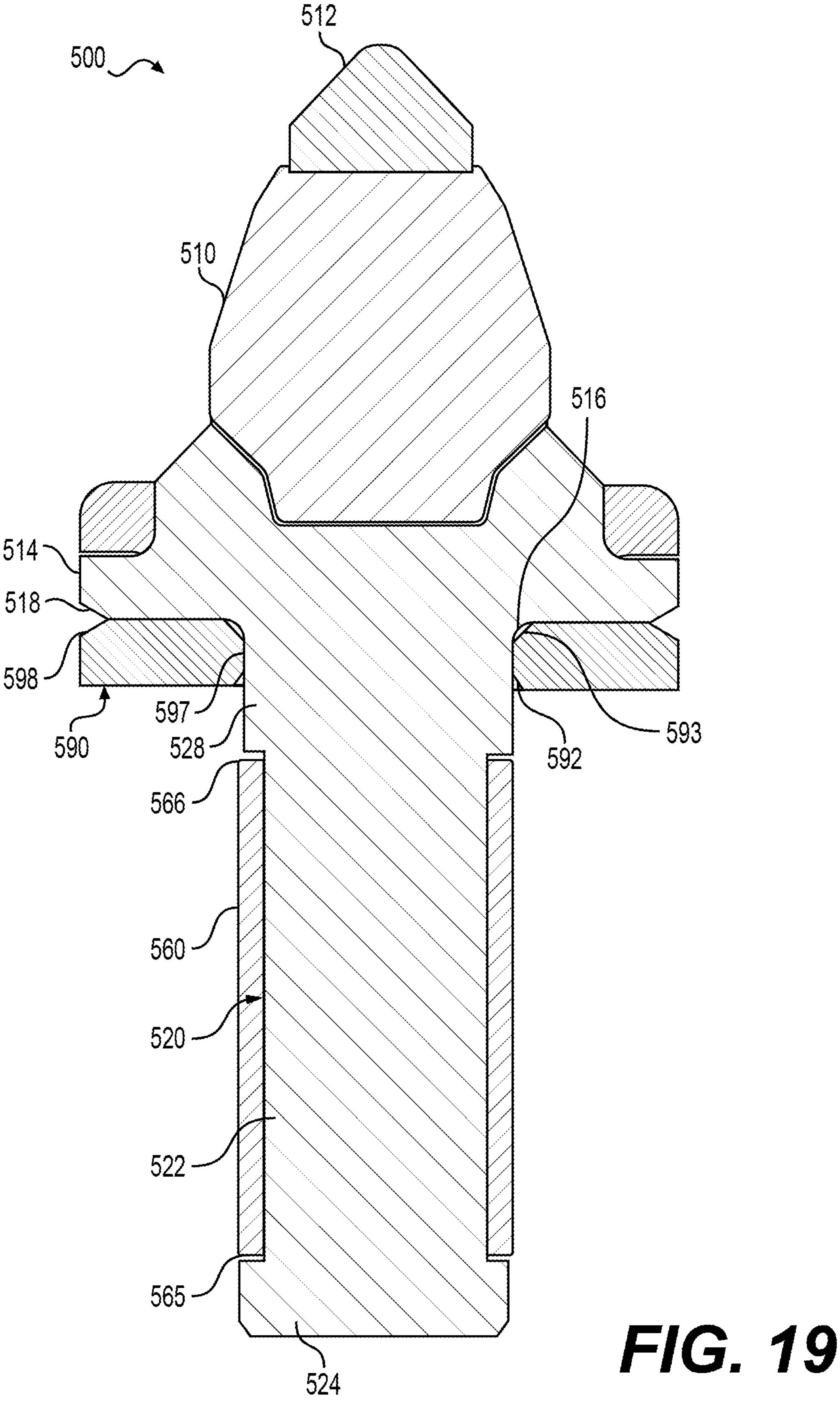
FIG. 19 is a cross-sectional view of a cutting bit assembly according to aspects of the present disclosure, with a washer in an installed position.
Figure 20:
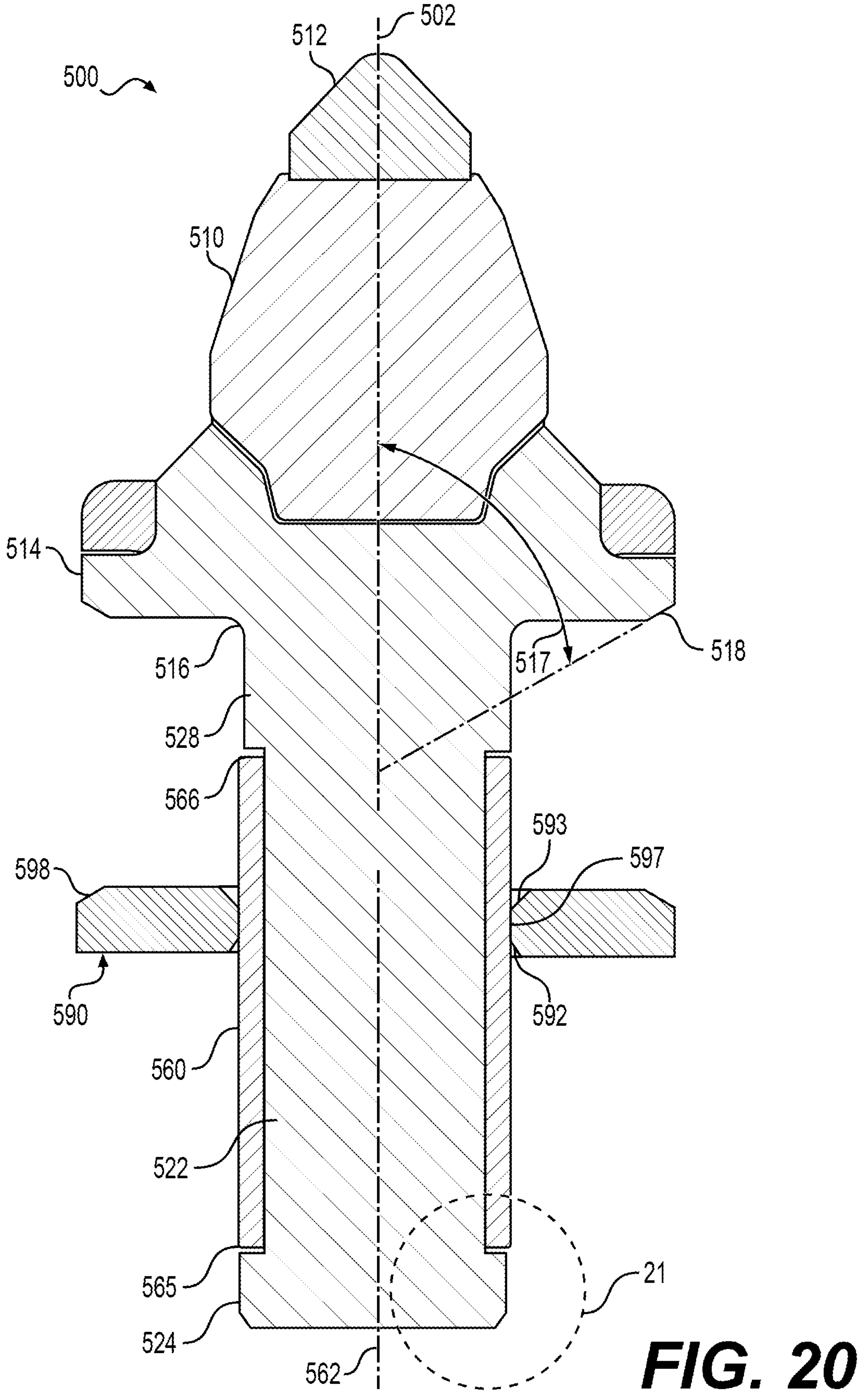
FIG. 20 is a cross-sectional view of the cutting bit assembly of FIG. 19, with the washer in a pre- or post-installed position.

FIG. 19 shows cutting bit assembly 500 in an installed configuration with washer 590 abutting flange 514 of cutting tip 510. The installed configuration of washer 590 corresponds to the position of washer 590 when cutting bit assembly 500 is inserted into mounting bore 122 of tool holder 110 of FIG. 1. In particular, washer 590 is constrained between end face 120 of tool holder 110 (see FIG. 1) and flange 514 of cutting tip 510. FIG. 20 shows cutting bit assembly 500 in an uninstalled configuration with washer 590 surrounding spring clip 560 and retaining spring clip 560 in the contracted configuration. The uninstalled configuration of washer 590 corresponds to the position of washer 590 prior to installation into tool holder 110 or after removal from tool holder 110. For example, the uninstalled configuration may correspond to the position of washer 590 on a new cutting bit assembly 500 supplied to a customer, and/or to the position of washer 590 after cutting bit assembly 500 has been removed from tool holder 110 for re-use.

As shown in FIGS. 19 and 20, a fillet 516 may be formed between flange 514 and shoulder 528 of shank 520 of cutting bit assembly 500. Fillet 516 may have a radius of, for example, 1.5 mm. In some aspects, fillet 516 may be substituted for, or may be supplemented by, a bevel. Bore 591 of washer 590 may include a beveled distal edge 593 that fits over fillet (or bevel) 516 to allow washer 590 to sit flush against flange 514, as shown in FIG. 19. Further details of beveled distal edge 593 of bore 591 are described herein with reference to FIGS. 22-24.

Referring still to FIGS. 19 and 20, a proximal edge 518 of flange 514 may be beveled. An angle 517 (see FIG. 20) of the bevel of proximal edge 518 may be in a range of about 40° to about 80°, and in some aspects about 60°, relative to a longitudinal axis 502 of cutting bit assembly 500. In some aspects, proximal edge 518 may have a radius instead of, or in addition to, the bevel.

Referring still to FIGS. 19 and 20, distal edge 566 of spring clip 560 may be beveled to guide spring clip 560 into bore 591 of washer 590, such as when cutting bit assembly 500 is removed from mounting bore 122 of tool holder 110 (see FIG. 1). In particular, distal edge 566 of spring clip 560 engages bore 591 of washer 590 when washer 590 is slid off of shoulder 528 of shank 520 and onto spring clip 560 during a transition of cutting bit assembly 500 from the installed configuration of FIG. 19 to the uninstalled configuration of FIG. 20. An angle of the bevel of distal edge 566 may be in a range of about 30° and about 60°, and, in some aspects, about 45°, relative to longitudinal axis 562 of spring clip 560. In some aspects, distal edge 566 may have a radius instead of, or in addition to, the bevel.

Figure 21:
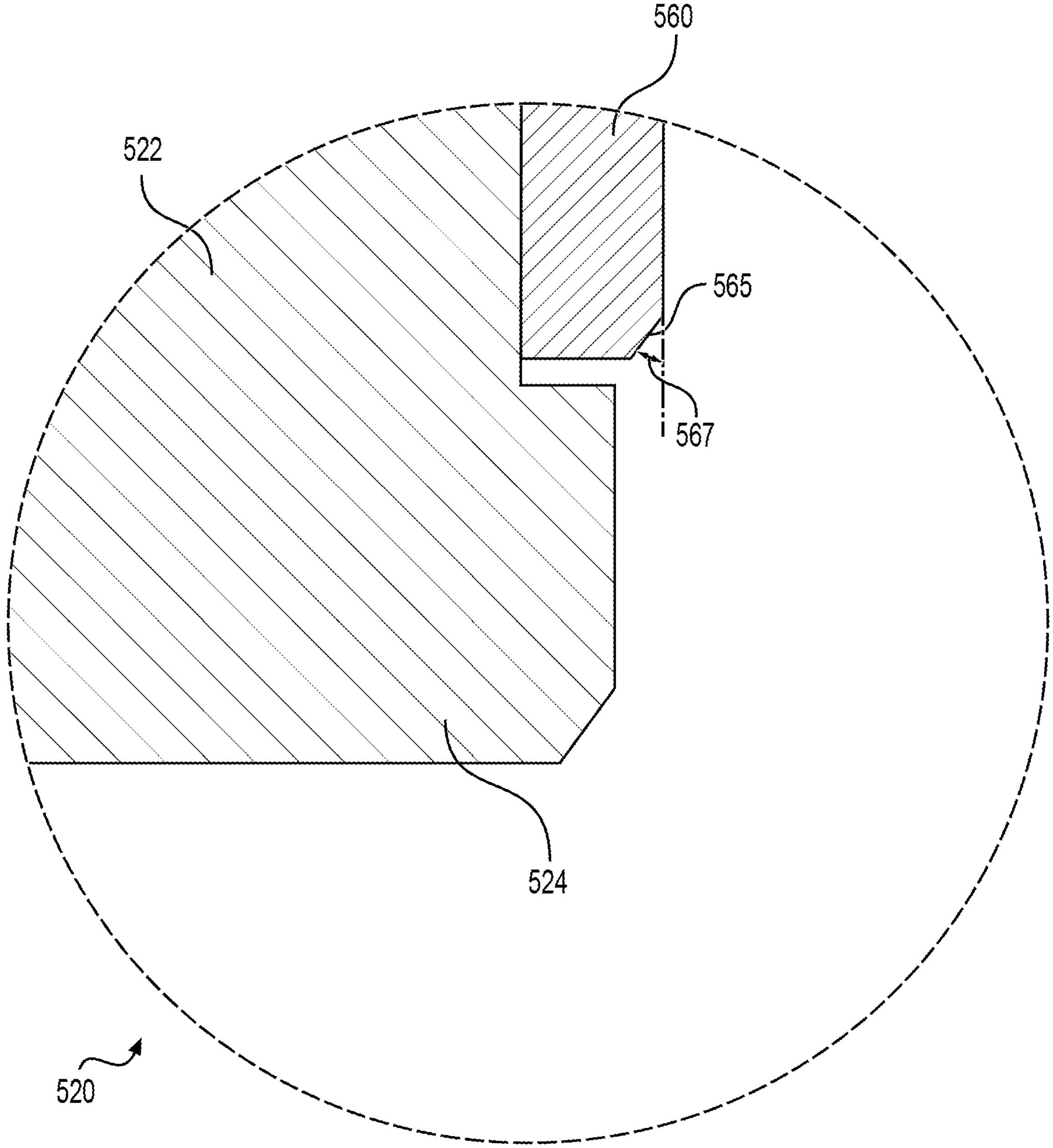
FIG. 21 is a cross-sectional view of detail 21 of the cutting bit assembly of FIG. 20

Referring now to FIG. 21, a detail view including proximal end 524 of shank 520 and a proximal edge 565 of spring clip 560 is illustrated. With spring clip 560 in the contracted configuration (i.e., when washer 590 surrounds spring clip as in FIG. 20), an outer diameter of spring clip 560 is greater than the outer diameter of proximal end 524 of shank 520. This allows proximal end 524 of shank 520 to be a slip fit into mounting bore 122 of tool holder 110 (see FIG. 1), while spring clip 560 has a light interference fit with mounting bore 122. To provide a smooth transition between proximal end 524 of shank 520 and spring clip 560, and to guide spring clip 560 into mounting bore 122, distal edge 566 of spring clip 560 may be beveled. The bevel of distal edge 566 of spring clip 560 may have an angle 567 in a range of about 30° and about 60°, and, in some aspects, about 45°, relative to the vertical outer surface of spring clip 560. In some aspects, distal edge 565 of spring clip 560 may have a radius instead of, or in addition to, the bevel.

Figure 22:
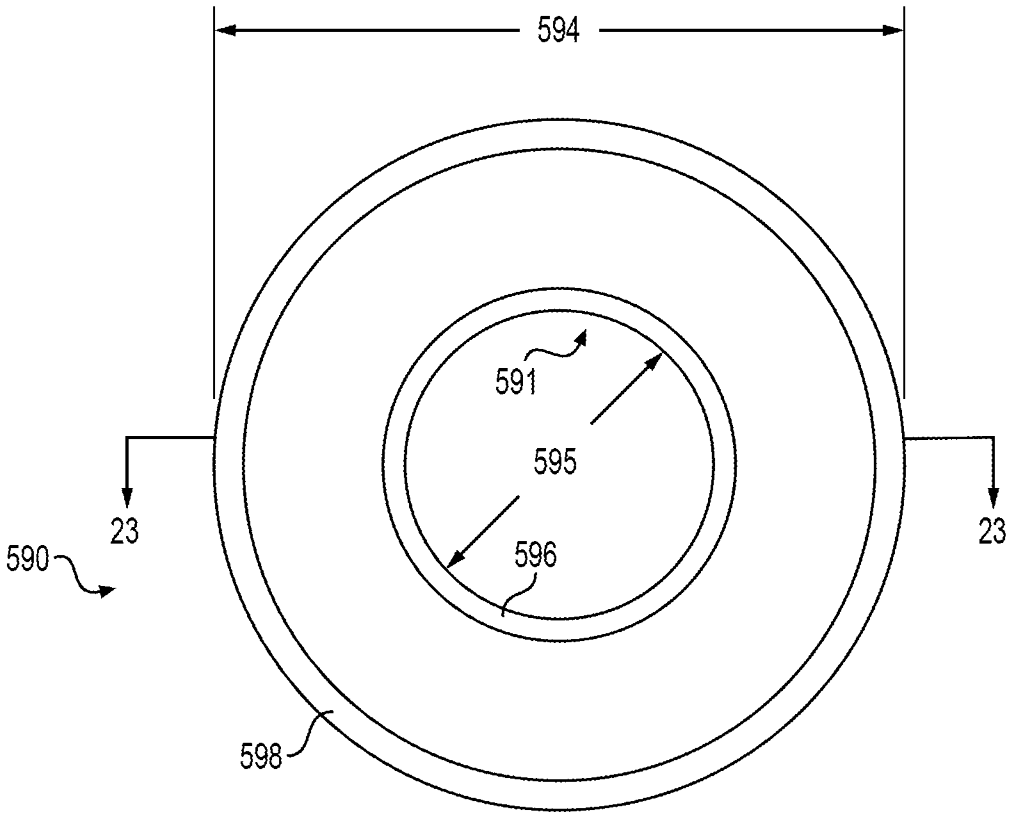
FIG. 22 is a top view of the washer of FIG. 19.
Figure 23:
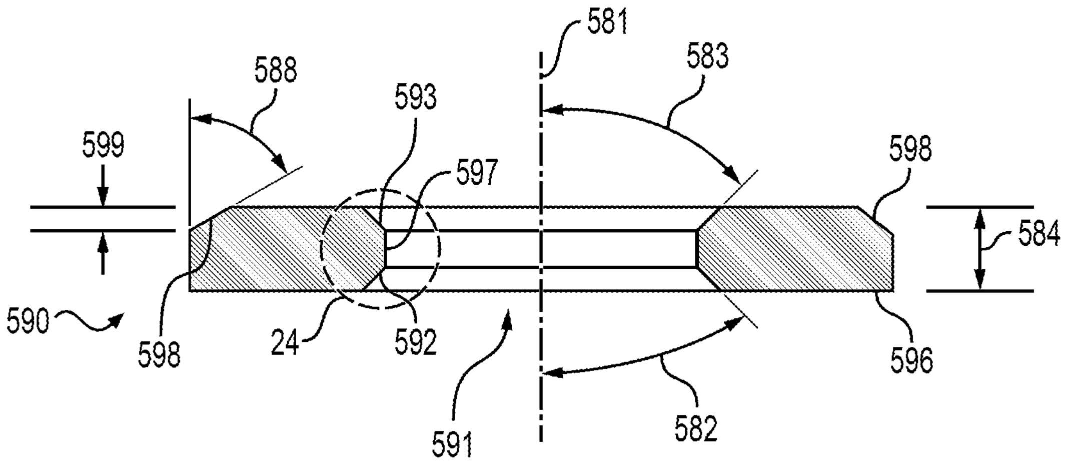
FIG. 23 is a cross-sectional side view of the washer of FIG. 19 taken along line 23-23 of FIG. 22.
Figure 24:
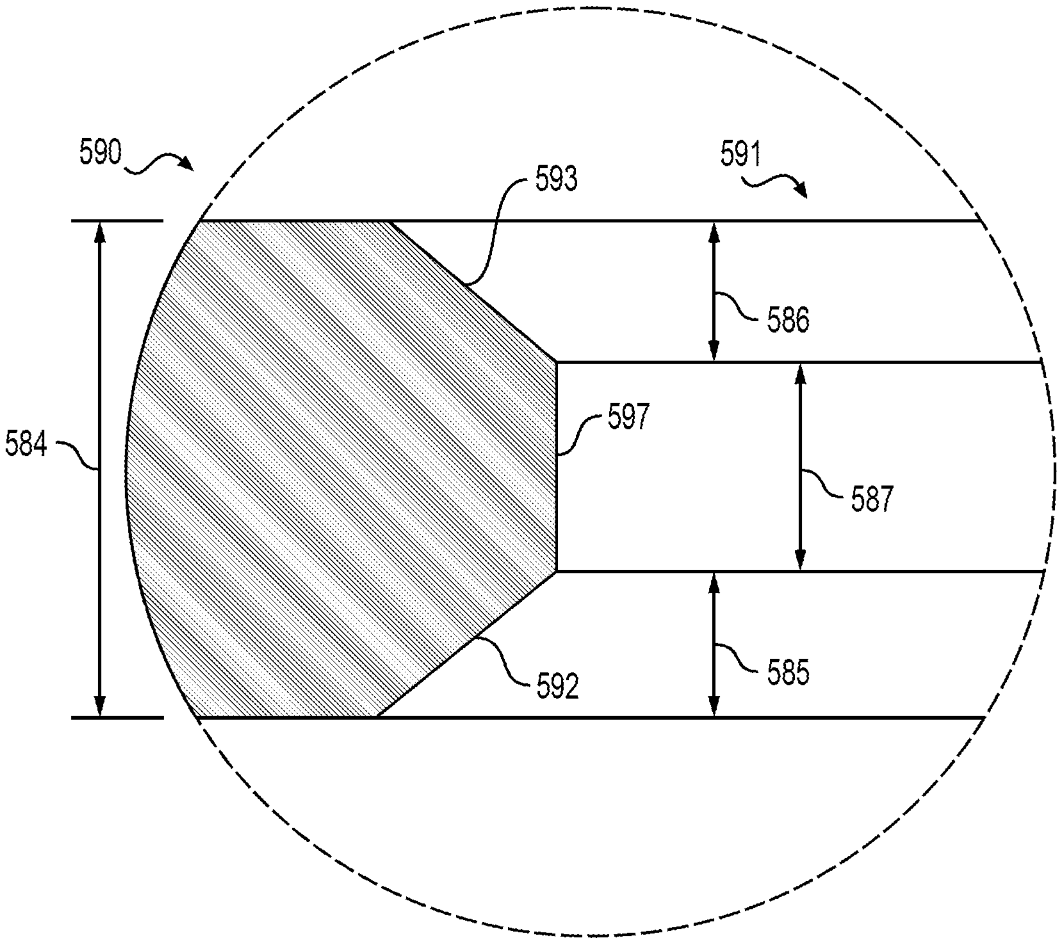
FIG. 24 is a cross-section view of detail 24 of the washer of FIG. 23.

Referring now to FIGS. 22-24, washer 590 is a generally annular structure defining bore 591 extending along a longitudinal washer axis 581 through a center of the annular structure. A diameter 595 of bore 591 is sized to retain spring clip 560 in the contracted configuration when washer 590 is disposed around spring clip 560, as shown in FIG. 20. Thus, the outer diameter of spring clip 560, in the contracted configuration, is the same as diameter 595 of bore 591. In some aspects, diameter 595 of bore 591 is in a range of about 18 mm to about 22 mm, and in some aspects about 20 mm. Washer 590 has an outer diameter 594 in a range of about 40 mm to about 50 mm, and in some aspects about 44.5 mm. In some aspects, outer diameter 594 is approximately equal to the outer diameter of flange 514 of cutting tip 510 (see FIGS. 19 and 20).

With continued reference to FIGS. 22-24, proximal edge 592 of bore 591 may be beveled to assist in guiding washer 590 over spring clip 560, such as when cutting bit assembly 500 is removed from tool holder 110 (see FIG. 1). An angle 582 of the bevel of proximal edge 592 may be in a range of about 15° to about 45°, and in some aspects about 30°, with respect to longitudinal washer axis 581. As noted above, distal edge 593 of the bore 591 may be beveled to fit over fillet (or bevel) 516 of flange 514 and shank 520 (see FIG. 20), allowing washer 590 to sit flush against flange 514. An angle 583 of the bevel of distal edge 593 may be in a range of about 30° to about 60°, and in some aspects about 45° with respect to longitudinal washer axis 581. In some aspects, angle 583 of distal edge 593 is greater than angle 582 of proximal edge 592 to suit the respective functions of the bevels. In particular, the bevel of the proximal edge 592 is configured to engage the spring clip 560, whereas the bevel of the distal edge 593 is configured to fit over fillet 516. In some aspects, each of proximal edge 592 and/or distal edge 593 of bore 591 may have a radius instead of, or in addition to, the bevel.

As shown in FIG. 23, outer distal edge 598 of washer 590 may be beveled at an angle 588 in a range of about 40° to about 80°, and in some aspects about 60°, relative to a vertical axis (i.e., an axis parallel to washer axis 581). The bevel of outer distal edge 598 may have a height 599 in a range of about 1 mm to about 2 mm, and in some aspects about 1.3 mm. In some aspects, outer distal edge 598 may have a radius instead of, or in addition to, the bevel.

As shown in FIGS. 23 and 24, washer 590 may have an overall thickness 584 in a range of about 3 mm to about 7 mm, and some aspects about 5 mm. As shown in FIG. 24, thickness 584 of washer 590 is equal to the sum of a height 585 of the bevel of proximal edge 592, a height 586 of the bevel of distal edge 593, and a height 587 of a vertical sidewall 597 between the bevels of proximal and distal edges 592, 593. Height 585 of the bevel of proximal edge 592 may be in a range of 1 mm to 2 mm, and in some aspects about 1.3 mm. Height 586 of the bevel of distal edge 593 may be in a range of 1 mm to 2 mm, and in some aspects about 1.5 mm. Height 587 of vertical sidewall 597 may be in a range of about 1 mm to about 5 mm, and in some aspects about 2.2 mm. In some aspects, height 587 of vertical sidewall 597 is greater than height 585 of the bevel of proximal edge 592, and height 587 of vertical sidewall 597 is greater than height 586 of the bevel of distal edge 593.

Vertical sidewall 597 of washer 590 engages an outer surface of spring clip 560 (as shown in FIG. 20) when washer 590 is in the uninstalled configuration. Height 587 of vertical sidewall 597 may be selected to prevent angular misalignment between washer 590 and spring clip 560. That is, height 587 of vertical sidewall 597 may maintain washer axis 581 substantially parallel with longitudinal axis 562 of spring clip 560 (see FIG. 20). Generally, vertical sidewall 597 becomes more resistant to misalignment with spring clip 560 as height 587 increases. Thus, height 587 of vertical sidewall 597 is desirably maximized for a given thickness 584 of washer 590. This may prevent binding of washer 590 against spring clip 560 and/or prevent incomplete seating of washer 590 against flange 514 during insertion of cutting bit assembly 500 into tool holder 110 (see FIG. 1). However, height 587 of vertical sidewall 597 is limited by height 586 of the bevel of distal edge 593, which must be sufficiently large to provide clearance for fillet (or bevel) 516 of flange 514 (see FIGS. 19 and 20). Further, height 587 of vertical sidewall 597 may be limited by height 585 of the bevel of proximal edge 592, which assists in guiding spring clip 560 into bore 591, as described herein.

INDUSTRIAL APPLICABILITY

The disclosed aspects of cutting bit assembly 200 as set forth in the present disclosure may be used for milling surfaces, such as asphalt roadways, when installed in milling drum 100 of a cold planer (also called a road mill or scarifier). As milling drum 100 rotates, cutting bit assembly 200 breaks the roadway surface into small pieces that can be removed and taken from the worksite. The interaction between rotation-limiting surface 230 of shank 220 and protrusions 270, 280 of spring clip 260 limits and/or prohibits rotation of cutting bit assembly 200 within tool holder 110, which may increase the life of cutting bit assembly 200 and/or tool holder 110. Particularly, by limiting or prohibiting rotation of cutting bit assembly 200, only the cutting side of cutting tip 210 experiences significant wear during milling operation. The non-cutting side of cutting tip 210 experiences less significant or negligible wear and therefore provides structural support for the cutting side of cutting tip 210. Furthermore, the lack of significant rotation of cutting bit assembly 200 results in low or negligible wear on end face 120 of tool holder 110.

Figure 17:
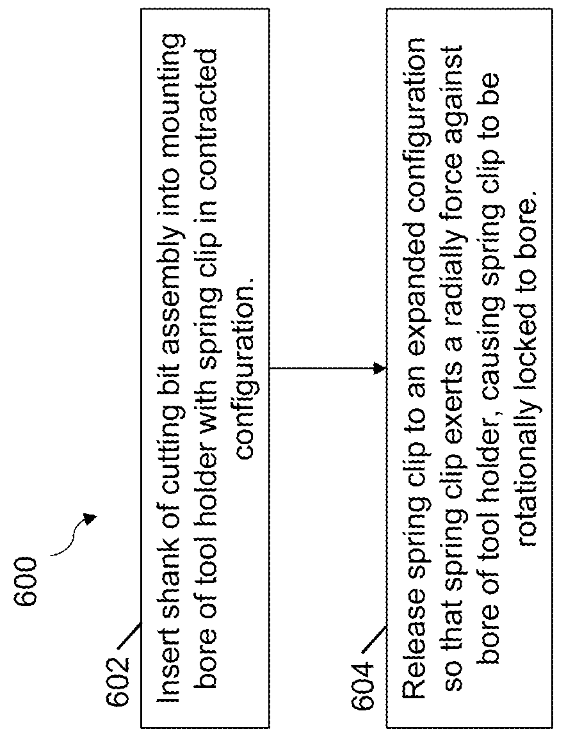
FIG. 17 provides a flowchart depicting an exemplary method for installing a cutting bit assembly into a tool holder, according to aspects of the present disclosure.

Referring now to FIG. 17, illustrated is a flow diagram illustrating an exemplary method 600 for installing cutting bit assembly 200 in tool holder 110. Method 600 includes, at step 602, inserting shank 220 of cutting bit assembly 200 into mounting bore 122 of tool holder 110 with spring clip 260 in the contracted configuration. Washer 290 surrounds spring clip 260, as shown in FIG. 3, to hold spring clip in the contracted configuration. Proximal end 224 of shank 220 is inserted first into mounting bore 122, and is pressed into mounting bore 122 until washer 290 contacts end face 120 of tool holder 110.

Method 600 further includes, at step 604, releasing spring clip 260 from the contracted configuration so that spring clip 260 exerts a radially outward force against mounting bore 122 of tool holder 110, thereby causing spring clip 260 to be longitudinally and rotationally locked to mounting bore 122. Releasing spring clip 260 at step 604 may be achieved by pressing and/or hammering shank 220 fully into mounting bore 122 of tool holder 110 so that washer 290 is pressed onto shoulder 228 of shank 220. For example, shank 220 may be pressed into mounting bore 122 using a pneumatic gun equipped with an installation cup so as to not damage cutting tip 210. Washer 290 is slid along the outer surface of spring clip 260, until washer 290 clears spring clip 260, travels over shoulder 228, and engages flange 214 of cutting tip 210. As spring clip 260 is no longer radially constrained by washer 290 in the contracted configuration, spring clip 260 radially expands and frictionally engages mounting bore 122 of tool holder 110. The inner diameter of mounting bore 122 is less than the outer diameter of spring clip 260 in the expanded configuration, so the spring bias of spring clip 260 generates a frictional force against mounting bore 122. Thus, spring clip 260 is longitudinally and rotationally locked in mounting bore 122. Further, rotation-limiting surface 230 of shank 220 interacts with protrusion 270 of spring clip 260 to limit rotation of shank 220, and therefore limit rotation of cutting tip 210, relative to spring clip 260 and mounting bore 122.

In some aspects, attempted rotation of cutting tip 210 may increase the grip of spring clip 260 on mounting bore 122. In the aspect of FIGS. 2-6, rotation of shank 220 relative to spring clip 260 such that first planar surface 232 of shank 220 engages third planar surface 272 of spring clip 260 causes the radially outward force exerted by spring clip 260 on mounting bore 122 to increase. As such, the anti-rotation effect of spring clip 260 is enhanced. Similarly, rotation of shank 220 relative to spring clip 260 such that second planar surface 234 of shank 220 engages fourth planar surface 274 of spring clip 260 causes the force exerted by spring clip 260 on mounting bore 122 to increase.

As a result of limiting or prohibiting rotation of cutting bit assembly 200 during operation of the cold planer, the life of cutting assembly 200 may be increased by limiting an area of the cutting tip 210 that experiences wear. Further, the life of tool holder 110 may be increased because there may be reduced wear caused by flange 214 and washer 290 rotating against end face 120.

While the foregoing descriptions of method 600 was described in conjunction with the aspect of cutting bit assembly 200 illustrated in FIGS. 2-6, it will be understood by those skilled in the art that method 600 could be equally utilized with the aspects of cutting bit assembly 300 of FIGS. 7-10, cutting bit assembly 400 of FIGS. 11-16, and/or cutting bit assembly 500 of FIGS. 19-24. Various feature of cutting bit assembly 500 of FIGS. 19-24 may facilitate performance of method 600. For example, the bevel (or radius) of proximal edge 565 of spring clip 560 aligns spring clip 560 with mounting bore 122 of tool holder 110 (FIG. 1) to aid in insertion of cutting bit assembly 500 into mounting bore 122 at step 602. The bevel of proximal edge 565 thus provides a smooth transition from proximal end 524 of shank 520, which may have a clearance fit within mounting bore 122, to spring clip 560, which has a light press fit with mounting bore 122.

As washer 590 is slid distally along spring clip 560 toward shoulder 528 of shank 520, sidewall 597 of bore 591 of washer 590 remains engaged with an outer surface of spring clip 560 to keep washer 590 from tilting relative to longitudinal axis 562 of spring clip 560, thereby preventing binding of washer 590 against spring clip 560. As washer 590 engages flange 514 of cutting tip 510, the bevel (or radius) of distal edge 593 of bore 591 fits over fillet 516 to ensure washer 590 sits flush against flange 514.

Figure 18:
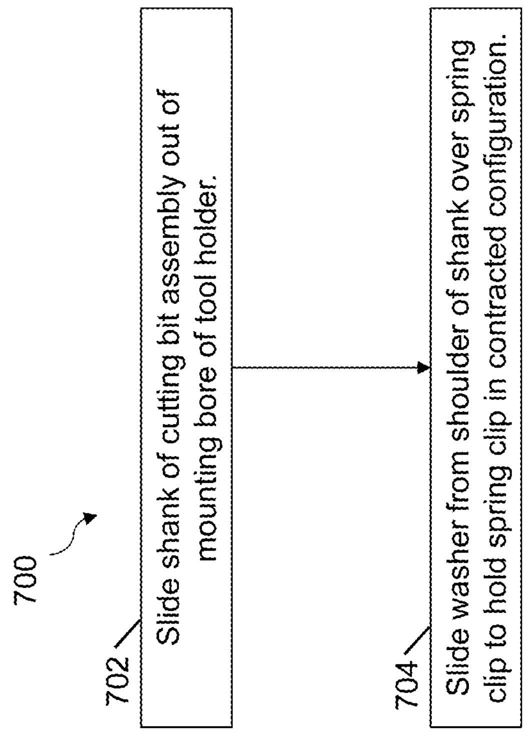
FIG. 18 provides a flowchart depicting an exemplary method for removing a cutting bit assembly from a tool holder, according to aspects of the present disclosure.

Referring now to FIG. 18, illustrated is a flow diagram illustrating an exemplary method 700 for removing cutting bit assembly 200 from tool holder 110. Method 700 includes, at step 702, sliding shank 220 of cutting assembly 200 out of mounting bore 122 of tool holder 110.

Method 700 further includes, at step 704, sliding washer 290 from shoulder 228 of shank 220 over spring clip 260 as shank 220 is being slid out of mounting bore 122 to hold spring clip 260 is the contracted configuration. Beveled distal edge 266 of spring clip 260 and/or beveled proximal edge 292 of washer 290 guide washer 290 onto spring clip 260. That is, beveled distal edge 266 of spring clip 260 forces spring clip 260 into the contracted configuration as washer 290 is slid over distal edge 266 of spring clip 260. Alternatively or additionally, beveled proximal edge 292 of washer 290 forces spring clip 260 into the contracted configuration as washer 290 is slid over distal edge 266 of spring clip 260.

Step 704 may be performed at least partially concurrently with step 702. That is, washer 290 may be slid over spring clip 260 concurrently with shank 220 being slid out of mounting bore 122. In some aspects, steps 702 and 704 may be performed using a prying tool (not shown) inserted between washer 290 and flange 214 of cutting tip 210. Prying tool separates washer 290 from flange 214 and, concurrently, slides shank 220 out of mounting bore 122. Bevel on distal edge 298 outer diameter of washer 290 may assist in inserting prying tool between washer 290 and flange 214.

In some aspects, step 704 is completed when washer 290 is approximately centrally located along the length of spring clip 260, as shown in FIG. 3 or FIG. 8. Shank 220 may then be fully removed from mounting bore 122, without further moving washer 290. In particular, shank 220 can be fully removed from mounting bore 122 without further moving washer 290 by prying or pulling on flange 214, without exerting significant force on washer 290. Thus, once cutting bit assembly 200 has been entirely removed from tool holder 110, washer 290 retains spring clip 260 in the contracted configuration so that cutting bit assembly 200 can be re-used (i.e. inserted into another tool holder).

While the foregoing descriptions of method 700 was described in conjunction with the aspect of cutting bit assembly 200 illustrated in FIGS. 2-6, it will be understood by those skilled in the art that method 700 could be equally utilized with the aspects of cutting bit assembly 300 of FIGS. 7-10, cutting bit assembly 400 of FIGS. 11-16, and/or cutting bit assembly 500 of FIGS. 19-24. Various features of cutting bit assembly 500 of FIGS. 19-24 may facilitate performance of method 700. For example, the bevel (or radius) of proximal edge 518 of flange 514 and/or the bevel (or radius) of outer distal edge 598 of washer 590 may facilitate insertion of a tool between flange 514 and washer 590 during step 702.

Furthermore, features of washer 590 and/or spring clip 560 may assist in transitioning spring clip 560 to the contracted configuration and in moving washer 590 to the uninstalled configuration at step 704. For example, the bevel of proximal distal edge 592 of bore 591 of washer 590 guides spring clip 560 into bore 591 as washer 590 is slid from shoulder 528 of shank 520 onto spring clip 560. In particular, the bevel of proximal edge 592 of washer 590 engages spring clip 560 and axially aligns bore 591 of washer 590 with spring clip 560 to facilitate smooth sliding of washer 590 onto spring clip 560. Alternatively or additionally, the bevel of distal edge 566 of spring clip 560 guides spring clip 560 into bore 591 of washer 590 in substantially the same manner. That is, the bevel of distal edge 566 of spring clip 560 axially aligns spring clip 560 with bore 591 of washer 590 to facilitate smooth sliding of washer 590 onto spring clip 560. Once washer 590 is engaged with spring clip 560, sidewall 597 of bore 591 slides along an outer surface of spring clip 560 to keep washer 590 from misaligning (e.g., tilting) relative to longitudinal axis 562 of spring clip 560, thereby preventing binding of washer 590 against spring clip 560.

Aspects of the cutting bit assembly 200, 300, 400, 500 of the present disclosure facilitate removal and reuse of the cutting bit assembly. Removal and reuse of the cutting bit assembly 200, 300, 400, 500 may be desired, for example, when a milling operation is performed on a road surface having metal obstacles (e.g., manhole covers) that would potentially damage a PCB cutting tip. PCB-based cutting bit assemblies 200, 300, 400, 500 of milling drum 100 may be replaced with non-PCB cutting bit assemblies when used on road surfaces with such metal obstacles. Cutting bit assemblies 200, 300, 400, 500 may then be reinstalled in milling drum 100 for milling another road surface that does not have metal obstacles. To assist in removal of cutting bit assembly 200, 300, 400, 500 from milling drum 100, bevels of proximal edge 518 of flange 214 and/or outer distal edge 598 of washer 590 allow insertion of a prying tool for removal of cutting bit assembly 200, 300, 400, 500 from tool holder 110, as described above. Further, bevels of proximal edge 592 of bore 591 of washer 590 and/or distal edge 566 of spring clip 560 assist in transitioning washer 590 from the installed configuration (FIG. 19) to the uninstalled configuration (FIG. 20). Still further, bevel of proximal edge 565 of spring clip 560 assists in aligning cutting assembly 200, 300, 400, 500 with tool holder 110 during installation (or re-installation) of cutting assembly 200, 300, 400, 500.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A cutting bit assembly for attachment to a tool holder of a milling-type machine, the cutting bit assembly comprising:

a cutting tip;

a generally cylindrical shank extending from the cutting tip, the shank including a first planar surface and a second planar surface arranged at a first angle relative to each other;

a spring clip surrounding a body of the shank and including a contracted configuration and an expanded configuration, the spring clip including a third planar surface and a fourth planar surface arranged at a second angle relative to each other, wherein the second angle is greater than the first angle; and a washer having an installed configuration in which the washer is disposed on a shoulder of the shank and an uninstalled configuration in which the washer surrounds the spring clip and retains the spring clip in the contracted configuration, wherein at least one of a distal edge of the spring clip or a proximal edge of a bore of the washer comprises a bevel or radius.

2. The cutting bit assembly of claim 1, wherein a proximal edge of a flange of the cutting tip comprises a bevel or radius.

3. The cutting bit assembly of claim 1, wherein an outer distal edge of the washer comprises a bevel or radius.

4. The cutting bit assembly of claim 1, further comprising a fillet between the shank and a flange of the cutting tip, wherein a distal edge of the bore of the washer comprises a bevel or radius configured to fit over the fillet with the washer in the installed configuration.

5. The cutting bit assembly of claim 1, wherein the proximal edge of the bore of the washer has a bevel or radius, a distal edge of the bore of the washer has a bevel or radius, and the bore comprises a vertical sidewall between the proximal edge and the distal edge.

6. The cutting bit assembly of claim 5, wherein the bevel of the distal edge of the bore has an angle greater than a bevel of the proximal edge of the bore with respect to a longitudinal axis of the washer.

7. The cutting bit assembly of claim 5, wherein the vertical sidewall engages an outer surface of the spring clip when the washer is in the uninstalled configuration.

8. The cutting bit assembly of claim 5, wherein a height of the vertical sidewall is greater than a height of the bevel or radius of the proximal edge and greater than a height of the bevel or radius of the distal edge.

9. The cutting bit assembly of claim 1, wherein an outer diameter of the spring clip in the contracted configuration is greater than an outer diameter of a proximal end of the shank, wherein a proximal edge of the spring clip has a bevel or radius transitioning between the outer diameter of the spring clip and the outer diameter of the proximal end of the shank.

10. The cutting bit assembly of claim 1, wherein the third planar surface is configured to engage the first planar surface and the fourth planar surface is configured to engage the second planar surface such that rotation of the shank is limited relative to the spring clip.

11. A cutting bit assembly for attachment to a tool holder of a milling-type machine, the cutting bit assembly comprising:

a cutting tip;

a generally cylindrical shank extending from the cutting tip, the shank including a groove;

a spring clip surrounding a body of the shank and including a contracted configuration and an expanded configuration, the spring clip including a tab formed by bending an edge of the spring clip; and a washer having an installed configuration in which the washer is disposed on a shoulder of the shank and an uninstalled configuration in which the washer surrounds the spring clip and retains the spring clip in the contracted configuration, wherein at least one of a distal edge of the spring clip or a proximal edge of a bore of the washer comprises a bevel or radius, wherein the groove is configured to engage the tab.

12. The cutting bit assembly of claim 11, wherein the groove extends substantially along an entire length of the body of the shank.

13. The cutting bit assembly of claim 11, wherein the tab extends substantially along an entire length of the spring clip.

14. The cutting bit assembly of claim 11, wherein the spring clip includes a second tab formed by bending a second edge of the spring clip, and further wherein the groove is configured to engage the tab and the second tab.

15. A cutting bit assembly for attachment to a tool holder of a milling-type machine, the cutting bit assembly comprising:

a cutting tip;

a generally cylindrical shank extending from the cutting tip;

a spring clip surrounding a body of the shank and including a contracted configuration and an expanded configuration, the spring clip having a protrusion;

a pin located between the shank and the protrusion; and a washer having an installed configuration in which the washer is disposed on a shoulder of the shank and an uninstalled configuration in which the washer surrounds the spring clip and retains the spring clip in the contracted configuration, wherein at least one of a distal edge of the spring clip or a proximal edge of a bore of the washer comprises a bevel or radius.

16. The cutting bit assembly of claim 15, wherein the protrusion includes one or more indentations configured to secure pin between the shank and the protrusion, and wherein, when secured, the pin is configured to limit rotation of the shank relative to the spring clip.

17. The cutting bit assembly of claim 15, wherein the pin is generally cylindrical and aligned parallel to a longitudinal axis of the spring clip.

18. The cutting bit assembly of claim 15, wherein the pin is integrally formed with the shank.

19. The cutting bit assembly of claim 15, wherein the spring clip includes an inspection aperture configured to allow viewing of the pin through the spring clip.

* * * * *